United States Patent
Kanno et al.

(10) Patent No.: US 7,610,572 B2
(45) Date of Patent: Oct. 27, 2009

(54) SEMICONDUCTOR INTEGRATED CIRCUIT DEVICE WITH INDEPENDENT POWER DOMAINS

(75) Inventors: Yusuke Kanno, Kodaira (JP); Hiroyuki Mizuno, Musashino (JP); Yoshihiko Yasu, Kodaira (JP); Kenji Hirose, Tokorozawa (JP); Takahiro Irita, Kodaira (JP)

(73) Assignee: Renesas Technology Corp., Tokyo (JP)

( * ) Notice: Subject to any disclaimer, the term of this patent is extended or adjusted under 35 U.S.C. 154(b) by 286 days.

(21) Appl. No.: 11/447,168

(22) Filed: Jun. 6, 2006

(65) Prior Publication Data

US 2006/0291110 A1 Dec. 28, 2006

(30) Foreign Application Priority Data

Jun. 7, 2005 (JP) ............... 2005-166714

(51) Int. Cl.
*G06F 17/50* (2006.01)
*H01L 25/00* (2006.01)

(52) U.S. Cl. ............... 716/16; 716/1; 326/102

(58) Field of Classification Search ............... 716/1–2, 716/6, 16; 257/499–500, 335; 326/102; 361/18

See application file for complete search history.

(56) References Cited

U.S. PATENT DOCUMENTS 6,888,395 B2  5/2005  Mizuno et al. ............... 327/333

FOREIGN PATENT DOCUMENTS

JP  2003-078009 A  3/2003
JP  2003-218682 A  7/2003

OTHER PUBLICATIONS

Yusuke Kanno et al., "µI/O Architecture for 0.13-µm Wide-Voltage-Range System-on-a-Package (SoP) Designs" 2002 Symposium on VLSI circuits Digest of Technical Papers, pp. 168 to 169, Jun. 2002.

*Primary Examiner*—Stacy A Whitmore
(74) *Attorney, Agent, or Firm*—Miles & Stockbridge P.C.

(57) ABSTRACT

A semiconductor integrated circuit device having a control signal system for avoiding failure to check an indefinite signal propagation prevention circuit, for facilitating a check included in an automated tool, and for facilitating a power shutdown control inside a chip. In the semiconductor integrated circuit device, power shutdown priorities are provided by independent power domains (Area A to Area I). A method for preventing a power domain having a lower priority from being turned OFF when a circuit having a high priority is turned ON is also provided.

7 Claims, 28 Drawing Sheets

AreaA~AreaI : power domain
PDH1~PDH4 : power domain hierarchies

Power switch : OFF     Power switch : ON

SEMICONDUCTOR INTEGRATED CIRCUIT DEVICE WITH INDEPENDENT POWER DOMAINS

CROSS-REFERENCE TO RELATED APPLICATION

The present application claims priority from Japanese patent application No. JP 2005-166714 filed on Jun. 7, 2005, the content of which is hereby incorporated by reference into this application.

BACKGROUND OF THE INVENTION

The present invention relates to a semiconductor integrated circuit device. In particular, the present invention relates to a technique effectively applied to a system LSI for a portable device or a microprocessor.

In recent years, with high integration caused by a finer semiconductor manufacturing process, an SoC (System-on-a-Chip) has been generally known. As such, systems integrated on an LSI are known. However, with this finer process, a leakage current in each transistor has increased more and more, and a leakage current of the whole SoC chip has become very large. Conventionally, this leakage current has been thought to be important in a so-called standby state. However, this leakage current is becoming a problem at the time of operation.

For example, in the SoC for a portable cellular phone, the circuit scale has become tremendously large. In the future, it is expected that, in the worst state, about ¹/₁₀ of an operating current will be occupied by a leakage current. The SoC applied to a portable cellular phone is presumed as being driven by batteries. Moreover, because of its small size, its battery capacitance is limited. Thus, even at the time of operation, it is important to reduce this leakage current in order to have long time operation of a cellular phone device. A technique of using a circuit operated at different power supplies as a relay buffer (patent document 1) is known as a conventional technique.

In order to reduce a leakage current of the SoC, there is proposed a technique of subdividing a power domain inside of the chip, and then, selectively shutting down the power supply (patent document 2 and non-patent document 1)

[Patent document 1] Japanese Patent Laid-open Publication No. 2003-78009

[Patent document 2] Japanese Patent Laid-open Publication No. 2003-218682

[Non-patent document 1] 'µI/O Architecture for 0.13-µm Wide-Voltage-Range System-on-Package (SoP) Design' 2002 Symposium on VLSI circuits Digest of Technical Papers, pp. 168 to 169, June, 2002

SUMMARY OF THE INVENTION

In the foregoing SoC, there is an advantageous effect in reducing a leakage current of the SoC according to the techniques of patent document 2 and non-patent document 1. However, a plurality of independent power domains is provided inside of one chip. In the case where power shutdown is independently controlled, some problems occur as to the signal wiring in the chip. The problems are listed below.

1. Power shutdown variations increase in number, and an indefinite signal propagation prevention design becomes complicated.

2. A repeater (signal amplifier circuit) must be mounted.

3. A clock signal must be distributed.

4. A backup memory for retaining information must be mounted.

First, a description will be given with respect to problem 1. In a CMOS circuit, in the case where a signal indicating 0 (ground level VSS) or 1 (power supply level VDD) of a digital signal is included in an input section, a current called a penetration current is not generated. However, if a voltage of an intermediate value between these signals is inputted, there is a tendency that a large penetration current is fed. Thus, in the case where there is a fear that such a voltage of the intermediate value is applied, it is necessary to carry out reduction in the penetration current by using a function called µI/O. This can be achieved by using an AND function, for example. This is because, even in the case where an intermediate voltage has been inputted to one input of this AND function, the other input is set at VSS, thereby making it possible to reduce the penetration current and guarantee a Lo level at a circuit at a later stage.

In order to design independent power shutdown areas inside of an LSI, there is a need to assume that a signal outputted from the power shutdown area outputs an intermediate value, and a need to take necessary steps to avoid an influence of the intermediate value. In the case where there exists a plurality of independent power shutdown areas and power shutdown control is carried out in these areas independently, the above described penetration current preventing measure must be taken with respect to a signal passing from each of the power domains to another power domain. A current general design flow is divided into a logic design for designing a circuit function and a layout design for actually laying out a result of the design. This penetration current proof measure must be taken between these two design flows. If there are a plurality of variations, the control method becomes complicated. Thus, there is a fear that a design is not finished within a limited designing period.

A description will be given with respect to problem 2. An SoC chip is very large in circuit scale. Therefore, there is a tendency that a chip also becomes large in size. In such an SoC, for example, considering a case in which a signal from a center part of the chip is directly transmitted to the outside of the chip, a resistance (R) and a capacitance (C) of a wiring become large, respectively. Thus, a time constant of a signal represented by a product thereof becomes large, a transmission delay is degraded, and an unsharpened signal waveform is generated. If this unsharpened signal is inputted to a circuit receiving that signal, a large penetration current flows through that circuit. Thus, conventionally, an increase in signal delay and an increase in penetration current have been avoided by incorporating a relay buffer for amplifying a signal called a repeater, at proper intervals in order to transmit a signal from the center part of the chip.

However, in the case where the inside of the SoC is subdivided into a number of independent power domains, and power is independently shut down respectively, it becomes difficult to determine how this repeater is allocated. This is because, in the case where there is an area in which power is shut down in the middle of signal wiring, signal transmission stops there. In addition, problem 1 described above occurs depending on how the repeater is placed and a power shutdown state of a signal exchange block. That is, in the case where a signal from a power shutdown area is received by a repeater in an area in which power is applied, there is a need for a circuit, such as a NAND circuit, and a control signal. When such a circuit is applied in accordance with the number of combinations of power shutdown, there is a need for a very large number of circuits and signals.

Further, a description will be given with respect to problem 3. In general clock distributing signals are distributed everywhere on a chip by properly carrying out buffering from a common clock generator in the chip. However, in the case where the inside of the SoC is subdivided into a number of independent power domains, and power is shut down respectively independently, it becomes difficult to allocate a driver for this clock distribution. This is because, in the case where this clock signal is transmitted to a target power domain, if there exists a power domain in which power is shut down before the target area, power is shut down at a clock driver allocated there, thus making it impossible to distribute the clock signal to a later stage.

Lastly, a description will be given with respect to problem 4. As one of the problems with carrying out power shutdown, there is a problem that a CMOS circuit information is volatized. That is, a basic data retention method in a CMOS circuit is carried out by a circuit obtained by connecting two stages of inverters to each other (hereinafter, referred to as a balloon circuit) in the simplest configuration. This circuit cannot retain internal information if no power supply is applied. A circuit called a flip flop or a resistor file and the like can be exemplified as that having such a circuit.

In a current LSI, it is known to carry out a computing processing operation while retaining required information in such a flip flop or a resistor file. If the data retained in these circuits is lost, all of the information processing states before power shutdown are lost, thus making it impossible to restart information processing from a state preceding power shutdown. In order to reset this data, in general, it is necessary to save the data obtained before power shutdown to an external memory by means of a processing operation of an OS or the like; at the time of recovery from power shutdown, read out the required data again from that external memory or the like; and write the read out data in a flip flop or a resistor file. It is known that such a control requires several milliseconds or more, thus making it difficult to achieve high-speed recovery from power shutdown. Therefore, in order to achieve high-speed recovery from power shutdown, it is necessary to retain a minimum required information in the vicinity of a power shutdown area at the time of power shutdown.

Therefore, the present invention has been made to solve problems 1 to 4 described above. It is an object to provide a semiconductor integrated circuit device capable of arranging a control signal system in order to avoid a danger of failure to check an indefinite signal propagation prevention circuit or the like, further facilitating a check oriented to mounting on an automated tool, and facilitating power shutdown control inside of a chip.

The foregoing and other objects and novel features of the present invention would be apparent from a description of the present specification and the accompanying drawings.

Of the inventions disclosed in the present application, a brief description of the inventions is as follows.

According to the present invention, power shutdown priorities are provided by independent power domains (functional blocks); and a rule is provided, the rule defining that, in the case where a circuit having a high priority is turned ON, power cannot be turned OFF in a power domain having a lower priority, facilitating a designing method.

In addition, according to the present invention, areas capable of applying still another power supply are provided in the independent power domains, and a relay buffer (repeater) and a clock buffer or an information retaining latch for saving information are integrated in the areas. A layout may be correctively provided in a direction vertical to a direction in which cells are arranged in a row direction for the purpose of dispersing a current of a power supply line.

Specifically, the present invention is applied to a semiconductor integrated circuit device comprising a first power supply and first, second, and M+1-th functional blocks that are operated by second, third, and M-th power supplies different from power supplies for use in the first power supply and other functional blocks, respectively, wherein the first to M-th functional blocks are integrated on one chip. The present invention has the following features:

The second to M+1-th power supplies have power supplies independent from each other. In the first to M-th functional blocks, control of power shutdown can be independently achieved, and the power shutdown priorities are assigned respectively. The priorities are determined depending on operation and linkage specification of the functional blocks. In the functional blocks, hierarchies are defined in accordance with the priorities. Signal wiring relationships between functional blocks are associated with each other based on the priorities, and are hierarchically defined before carrying out the signal wiring. From among the first to M-th functional blocks, between J-th and K-th functional blocks located in the lower hierarchy and an L-th functional block located in the upper hierarchy of the J-th and M-th functional blocks, when exchange of a signal from the J-th functional block to the K-th functional block is carried out, the signal is transmitted via a signal relay buffer circuit provided inside of an L-th functional block. When a signal is transmitted from the J-th functional block to the L-th functional block, the signal is transmitted via an indefinite signal propagation prevention circuit. When a signal is transmitted from the L-th functional block to the K-th functional block, the indefinite signal propagation prevention circuit is eliminated.

The functional blocks in the upper hierarchy are provided inside of the functional blocks in the lower hierarchy. A layout of the functional blocks in the upper hierarchy provided in the functional blocks in this lower hierarchy is laid out so that a plurality of circuit cells are provided in a direction vertical to that of the power supply wiring in the lowest layer that is the power supply wiring of basic circuit cells. The power supplies of the functional blocks in the upper hierarchy are wired in a meshed shape inside of a chip so that a drop of a power voltage is minimized in the power supplies of the functional blocks in the lower hierarchy.

In addition, the present invention is applied to a semiconductor integrated circuit device, the device comprising: a power switch composed of a second gate insulating film having a thickness which is greater than a gate insulating film thickness of a first MISFET that configures a logic circuit; and a power switch controller composed of a MISFET having the second gate insulating film thickness. The present invention has the following feature:

The power switch controller first turns ON a small sized first power switch, and then, turns ON a large sized second power switch. The present invention is characterized in that, when control of the power switch is achieved to be turned ON/OFF, there are provided: a sensor circuit for detecting a voltage level of a virtual ground power supply and a sensor circuit for detecting a voltage level of a gate signal of the power switch.

In addition, another embodiment of a power switch controller is characterized in that an ON/OFF control is carried out by using one large sized power switch, and the control is carried out by controlling a gate signal of the power switch while switching a plurality of large and small driving drivers. Upon control of gate signals of these power switches, in order to minimize a deviation from a preset value, the present invention is characterized in that a signal at a distal end of the gate signals of the power switches is monitored, thereby controlling the power switches with high precision.

The sensor circuits used during control of these power switches serve as a dynamic comparator circuit for generating a clock signal inside of the power switch controller, and then, dynamically starting up a sense amplifier by using the generated clock signal.

In addition, the present invention is applied to a semiconductor integrated circuit device, the device comprising a circuit for monitoring an oscillation frequency of a ring oscillator, and observing a fluctuation of an internal power voltage.

Advantageous effects attained by the present invention will be described as follows:

According to the present invention, there is attained an advantageous effect that power shutdown priorities are determined as a design of power domains of an SoC in which there exist a plurality of areas in which power is shut down independently, and power shutdown areas are hierarchically defined, thereby making it possible to arrange a control signal system and avoid a danger of failure to check an indefinite signal propagation prevention circuit or the like. Further, there is also attained an advantageous effect that ruled power shutdown is provided, thereby facilitating a check oriented to mounting on an automated tool.

In addition, according to the present invention, there is attained an advantageous effect that, in one power domain, a power supply block other than the power supply in the area is provided; the provided block is laid out in a direction vertical to power supply wiring in the lowest layer for supplying power to standard cells; this area is defined as an area having a low power supply priority; and a relay buffer and a clock buffer or an information retaining latch at the time of power shutdown are mounted in that area, thereby making it possible to facilitate power shutdown control inside of a chip.

Additional objects and advantages of the invention will be set forth in the description which follows, and in part will be obvious from the description, or may be learned by practicing the invention. The objects and advantages of the invention may be realized and obtained by means of the instrumentalities and combinations particularly pointed out hereinafter.

DESCRIPTION OF THE PREFERRED EMBODIMENTS

Figure 1:
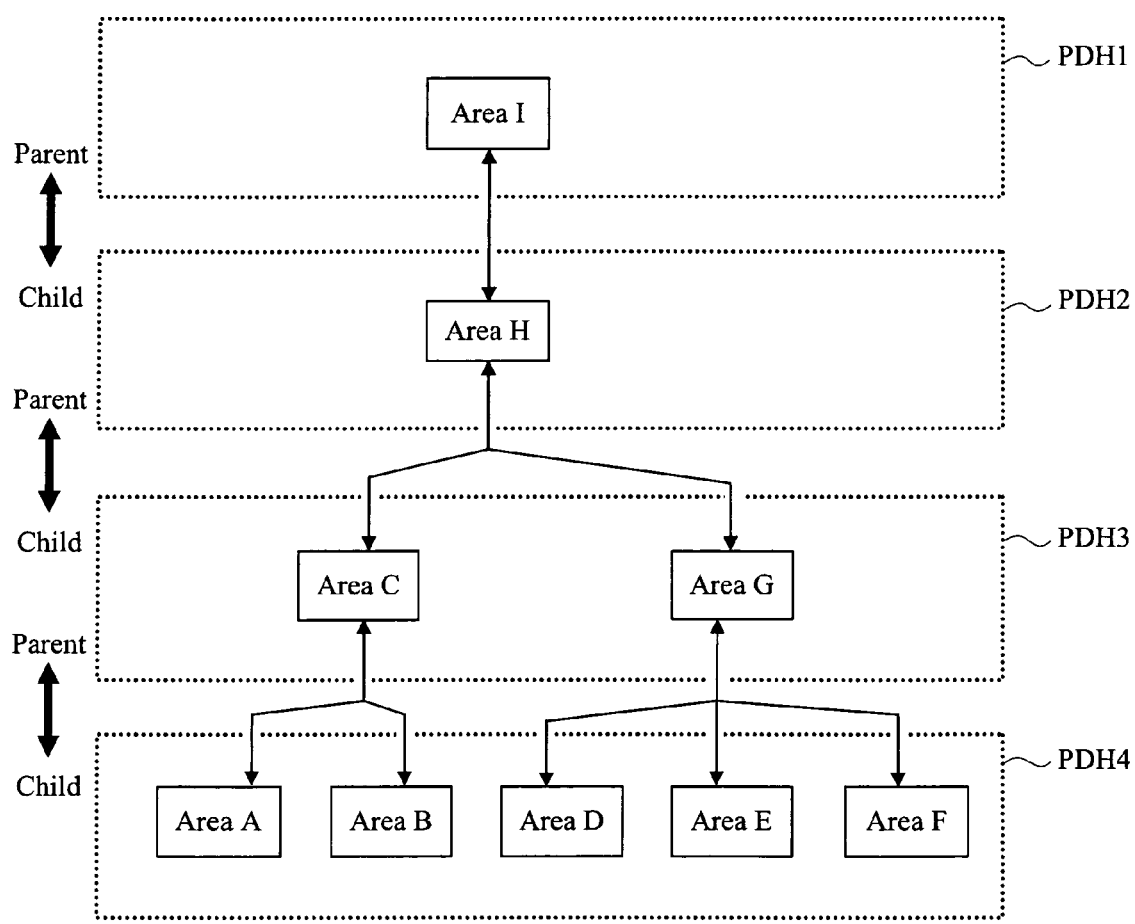
FIG. 1 is a view showing an example of a hierarchy in an independent power shutdown area in a first embodiment relating to a semiconductor integrated circuit device according to the present invention.

Hereinafter, preferred embodiments of the present invention will be described in detail with reference to the accompanying drawings. In all the drawings for illustrating embodiments, like constituent elements are designated by like reference numerals. A duplicate description is omitted. In addition, constituent elements and signal names configuring a semiconductor integrated circuit device will be occasionally described by using only signs assigned thereto.

In the following description, a power domain used here is referred to as a functional block. This functional block designates a block individually having a function such as a baseband processor, an application processor, and a memory.

First Embodiment

With reference to FIG. 1 to FIG. 5, a description will be given with respect to a first embodiment relating to a semiconductor integrated circuit device according to the present invention.

FIG. 1 is a view showing a method for configuring power domains with respect to a case in which four power domain hierarchies and nine independent power domains are assumed to exist inside of an SoC as an example of a hierarchy of independent power interrupt areas. These independent power domains are operated by a high voltage power supply and a ground power supply that is different from the high voltage power supply and a power supply used in other power domains, and the respectively different ground power supplies are supplied independently of each other. In addition, in these power domains, control of power shutdown can be achieved independently from each other; the power shutdown priorities are assigned respectively; the priorities are associated with each other based on a relationship between signal wirings; and the signal wirings are hierarchically carried out.

While FIG. 1 describes power domains Area A to Area I by power supply hierarchies PHD1 to PDH4, the upper priority is assigned to a power domain having a low power shutdown priority, and the power shutdown priority becomes higher as the hierarchy goes to the lower layer. Here, a lower priority is referred to as a "parent", and a higher priority is referred to as a "child".

In addition, a relationship between the "parent" and the "child" depends on a relationship between signal wirings. The arrow shown in the figure indicates a signal exchange relationship. For example, while the "parent" of Area A and Area B is Area C, Area G cannot be the "parent" of Area A and Area B. To the "parent", while power is applied to the "child", power is always applied continuously. Therefore, in signal wiring between power supply domains, even if power is shut down in the "child", indefinite propagation prevention control of a signal line can be carried out via the "parent". In this indefinite propagation prevention function, for example, control of an indefinite propagation prevention control signal may be achieved via the "parent" by applying a circuit technique (μI/O) described in the non-patent document 1, for example.

A method for shutting down power will be described by way of an example. First, assume a case in which communication is required in Area A and Area B. In this case, communication is made between Area A and Area B via Area C that falls in the "parent". Next, assume a case in which communication is required between Area A and Area D. In this case, a signal from Area A may be processed so as to be transmitted to Area D via Area C that falls in the "parent" of Area A and Area H that falls in the "parent" of Area C, and then, via Area G that falls in the "parent" of Area D.

Figure 2:
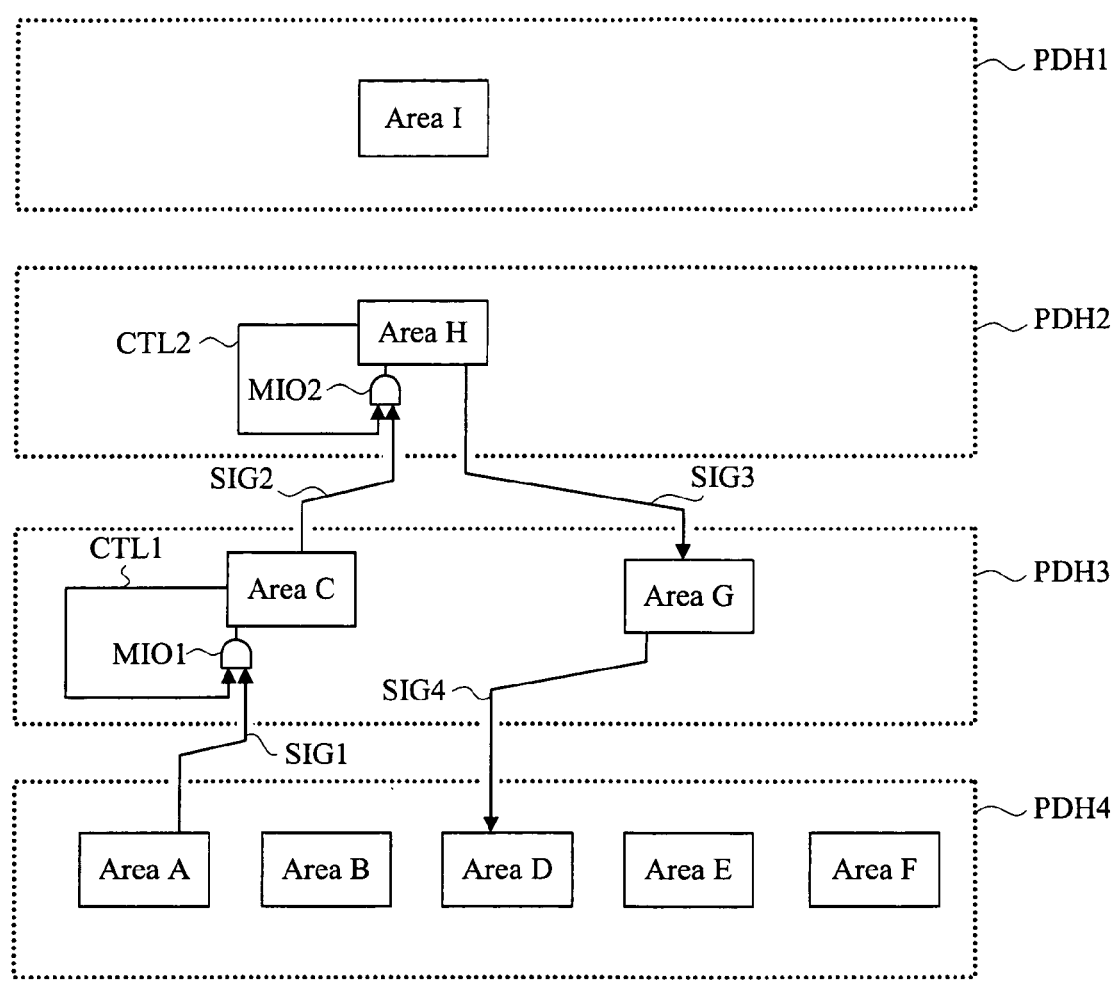
FIG. 2 is a view showing an example of signal exchange between independent power shutdown areas in the first embodiment relating to the semiconductor integrated circuit device according to the present invention.

FIG. 2 is a view specifically showing a case in which signal transmission from Area A and area D occurs as an example of signal exchange between independent power shutdown areas. A path of this signal transmission is composed of a signal SIG1 from Area A to Area C; a signal SIG2 from Area C to Area H; a signal SIG3 from Area H to Area G; and a signal SIG4 from Area G to Area D.

In this way, in the case where communication between two areas is transmitted across a plurality of power domains, it is necessary to provide an indefinite signal propagation prevention circuit. It is necessary to install this indefinite signal propagation prevention circuit to an input section of a signal transmitted from the "child" side to the "parent" side. It is not necessary to insert an indefinite signal propagation prevention circuit on a signal transmission path from the "parent" side to the "child" side. This is because, when a power shutdown control system according to the present invention is used, in the case where the power is shut down at the "child" side, the power supply at the "parent" side may be applied, and in the case where power is applied at the "child" side, also the power supply at the "parent" side is always applied.

In the example shown in FIG. 2, indefinite signal propagation prevention circuits MIO1 and MI02 may be provided, respectively, at an input section of Area C of a signal transmitted from Area A to Area C and at an input section of Area H of a signal transmitted from Area C to Area H. A control of control signals of the respective indefinite signal propagation prevention circuits are achieved by means of control signals from power domains in which these circuits are included. A control of MIO1 is achieved by means of a control signal CTL1 from Area C and a control of MIO2 is achieved by means of a control signal CTL2 from Area H. The control signals of these indefinite signal propagation prevention circuits are generated in Area C and Area H.

Figure 3:
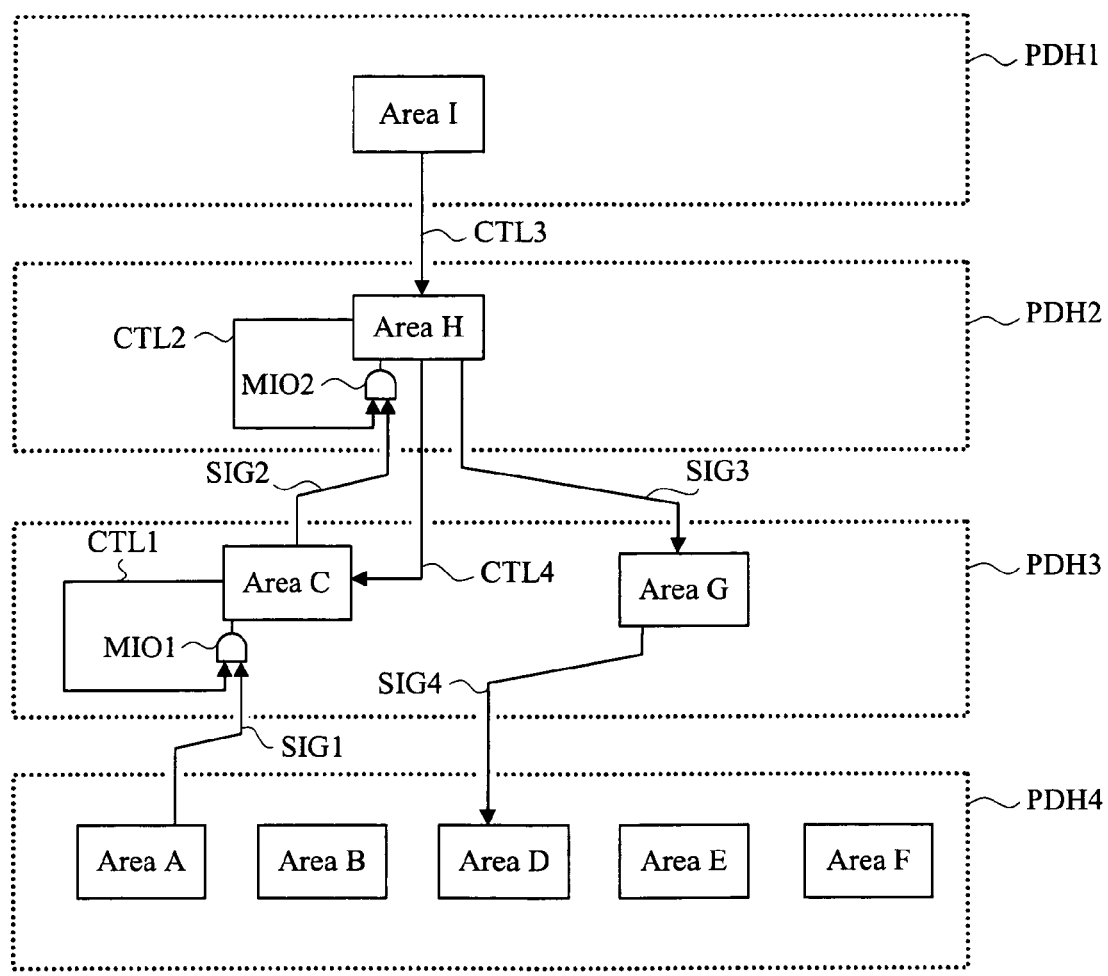
FIG. 3 is a view showing another example of signal exchange between independent power shutdown areas in the first embodiment relating to the semiconductor integrated circuit device according to the present invention.

FIG. 3 shows another example of signal transmission from Area A to Area D, as an example of signal exchange between independent power shutdown areas. A path of this signal transmission is composed of a signal SIG1 from Area A to Area C; a signal SIG2 from Area C to Area H; a signal SIG3 from Area H to Area G; and a signal SIG4 from Area G to Area D.

In the example shown in FIG. 3, an indefinite signal propagation prevention circuit may be provided as in FIG. 2. Namely, with respect to a signal to be transmitted from Area A to Area C, and a signal to be transmitted from Area C to Area H, indefinite signal propagation prevention circuits MIO1 and MIO2 may be provided at an input section of Area C and an input section of Area H, respectively. The control signal of each indefinite signal propagation prevention circuit is controlled by means of a control signal from a power domain in which the circuit is included. MIO1 is controlled by means of CTL1 from Area C, and MIO2 is controlled by means of CTL2 from Area H.

A difference from FIG. 2 is that the control signals of these indefinite signal propagation prevention circuits are controlled by means of a control signal from a block for integrally controlling a SoC (assuming that the control signals are provided in Area I) instead of being generated in Area C and Area H. In that case, a control signal is transmitted to Area H by means of CTL3, and that signal is divided into CTL2 and CTL4. CTL4 is further transmitted to Area C in the lower layer, and CTL1 is controlled. CTL1, CTL2, and CTL4 may be the same signal lines as CTL3. That is, with respect to these signal lines, a drive force is merely amplified and transmitted by means of a buffer circuit in Area H and Area C.

In addition, CTL1, CTL2, and CTL4 may be provided as signals, each of which is different from CTL3. That is, a control of CTL2 and CTL4 may be achieved after being logically computed in Area H. In this case, Area H can control CTL2 or CTL4 by using other conditions than CTL3, such as, for example, information contained inside of Area H. Similarly, Area C can control CTL1 by using the information contained in Area C as well as the information on CTL4.

Figure 4:
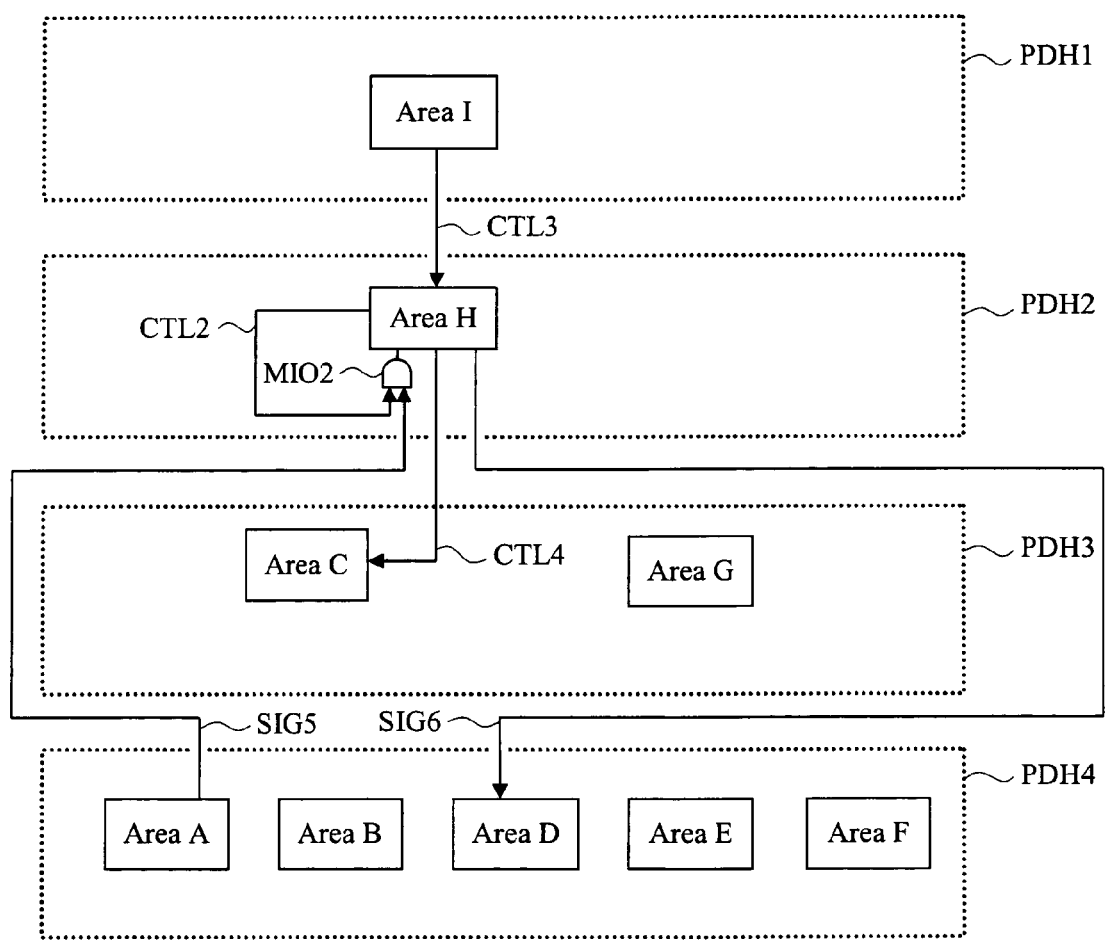
FIG. 4 is a view showing still another example of signal exchange between independent power shutdown areas in the first embodiment relating to the semiconductor integrated circuit device according to the present invention.

FIG. 4 shows still another example of a signal transmission from Area A to Area D, as an example of signal exchange between independent power shutdown areas. A path of this signal transmission is composed of a signal SIG5 from Area A to Area H and a signal SIG6 from Area H to Area D.

In the example shown in FIG. 4, an indefinite signal propagation prevention circuit MIO2 is provided at an input section of Area H of a signal transmitted from Area A to Area H. A control of the control signals of the respective indefinite signal propagation prevention circuits is achieved by means of control signals from power domains in which the circuits are included. A control of MIO2 is achieved by means of a control signal CTL2 from Area H.

The control signals of these indefinite signal propagation prevention circuits may be generated in Area H or may be generated in Area I. The embodiment can also be carried out in accordance with the method similar to those shown in FIG. 2 and FIG. 3. This embodiment shows that, in the case where there is a hierarchical structure of power shutdown as shown in FIG. 4, a connection can be made even if a signal is not transmitted via an intermediate hierarchy. In this case, it is through Area G provided between Area H and Area D as a physical (layout based) allocation. Transmission of a signal via Area G may contribute to improvement of signal quality. In that case, a signal can be transmitted via Area G, as shown in FIG. 2 and FIG. 3.

Figure 5:
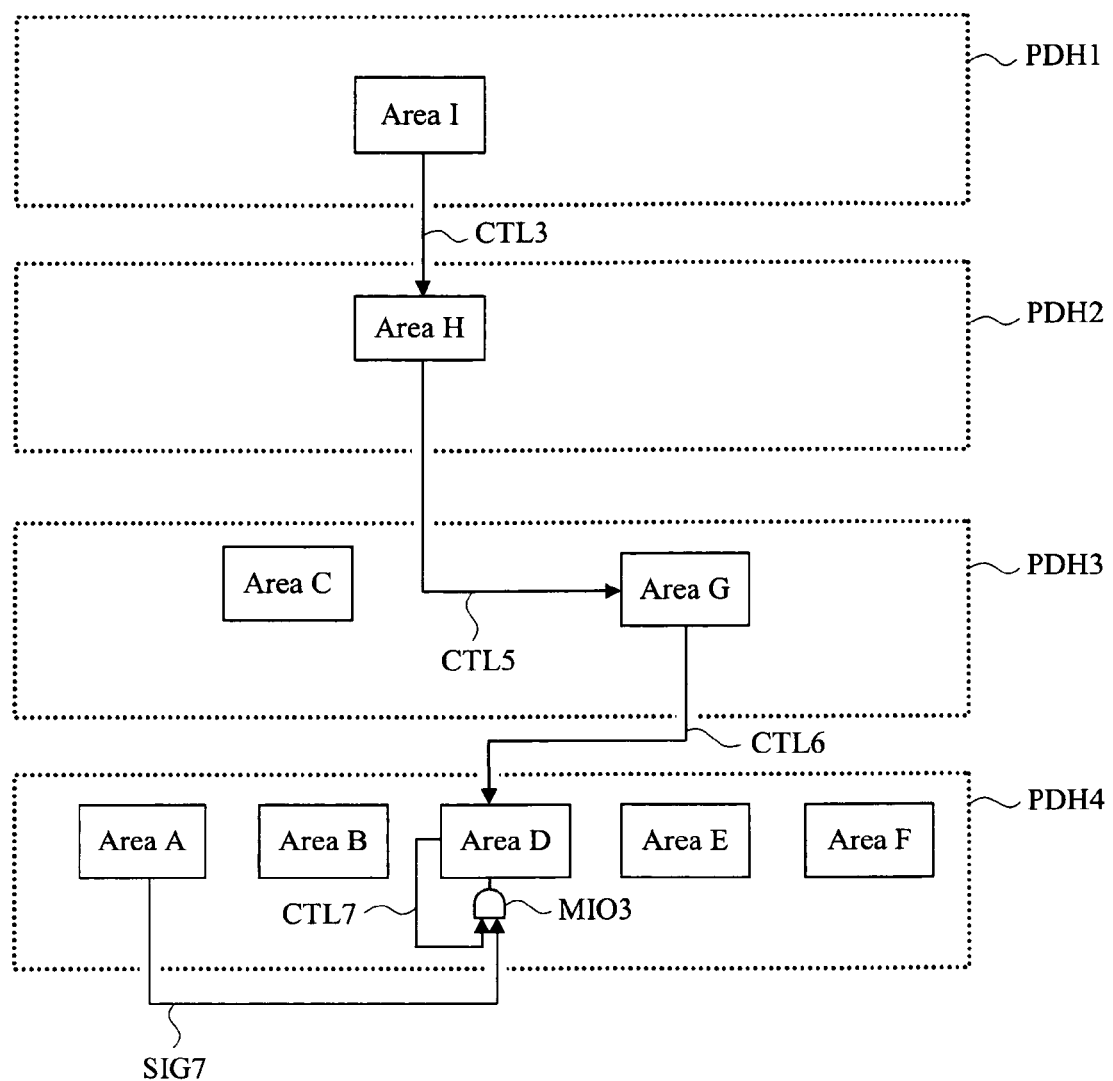
FIG. 5 is a view showing yet another example of signal exchange between independent power shutdown areas in the first embodiment relating to the semiconductor integrated circuit device according to the present invention.

FIG. 5 shows still another example of a signal transmission from Area A to Area D, as an example of signal exchange between independent power shutdown areas. Routing of this signal transmission is carried out by means of a signal SIG7 from, Area A to Area D.

In the example shown in FIG. 5, an indefinite signal propagation prevention circuit MIO3 is provided at an input section of Area D of a signal transmitted from Area A to Area D. A control of the control signals of the respective indefinite signal propagation prevention circuits is achieved by means of control signals from power domains in which the circuits are included. A control of MIO3 is achieved by means of a control signal CTL7 from Area D. What is emphasized here is that, even if a signal is not actually transmitted via a parent hierarchy, a control signal is actually transmitted via only the upper hierarchy from a functional block associated with communication, whereby a design of the indefinite signal propagation prevention circuit cannot be facilitated. According to the present invention, there is established a rule that, in the case where another functional block exists between functional blocks in which communication is required, and such a functional block has a relationship as a "child" to a functional block associated with communication, the communication is not made via that block. In the case where repeater wiring is physically mandatory, communication is carried out via a subsidiary power domain having a lower power shutdown priority, described later in detail.

The control signals of these indefinite signal propagation prevention circuits may be signals generated in Area D or signals (CTL3-CTL5-CTL6) which are generated in Area I and transmitted to Area D via Area H and Area G. The embodiment can be carried out basically in accordance with the method similar to those shown in FIG. 2 and FIG. 3. This embodiment shows that, in the case where there is a hierarchical structure of power shutdown as shown in FIG. 5 as well, connection can be made even if a signal is not transmitted via an intermediate hierarchy.

Signal transmission from Area A to Area D has been described with reference to FIGS. 2-5. A method for transmitting a signal from Area A to Area D has been described by way of a variety of examples. This is due to physical allocation of Area A and Area D. In the case where Area A and Area D are very distant from each other, it is desirable that a signal to be transmitted via each hierarchy, as shown in FIG. 2 and FIG. 3. However, in the case where Area A and Area D are allocated in proximity to each other, signal connection described in FIG. 4 or FIG. 5 is effective in order to reduce signal wiring to the minimum.

Up to now, a description has been given with respect to a designing system in SoC power domains including a plurality of areas in which power is shut down independently. As described above, there is attained an advantageous effect that a rank of facility of power shutdown is determined, and power shutdown areas are hierarchically defined, whereby a control signal system is arranged, and a danger of failure to check an indefinite signal propagation prevention circuit or the like can be avoided. In addition, by providing ruled power shutdown, there is attained an advantageous effect that a check oriented to mounting on an automated tool is facilitated.

Second Embodiment

Figure 6:
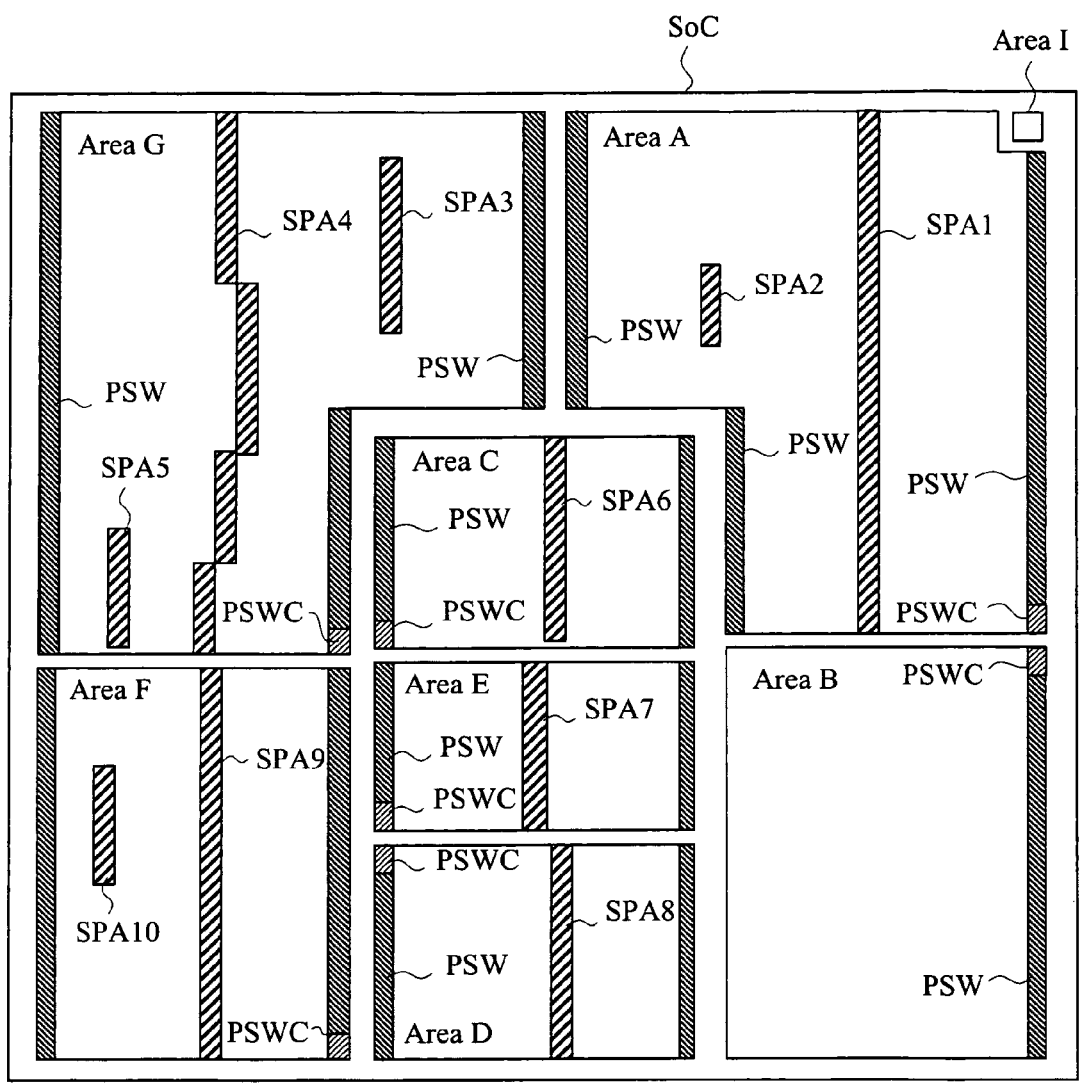
FIG. 6 is a view showing an example in the case where an independent power shutdown area is mounted on a chip in a second embodiment relating to a semiconductor integrated circuit device according to the present invention.
Figure 7:
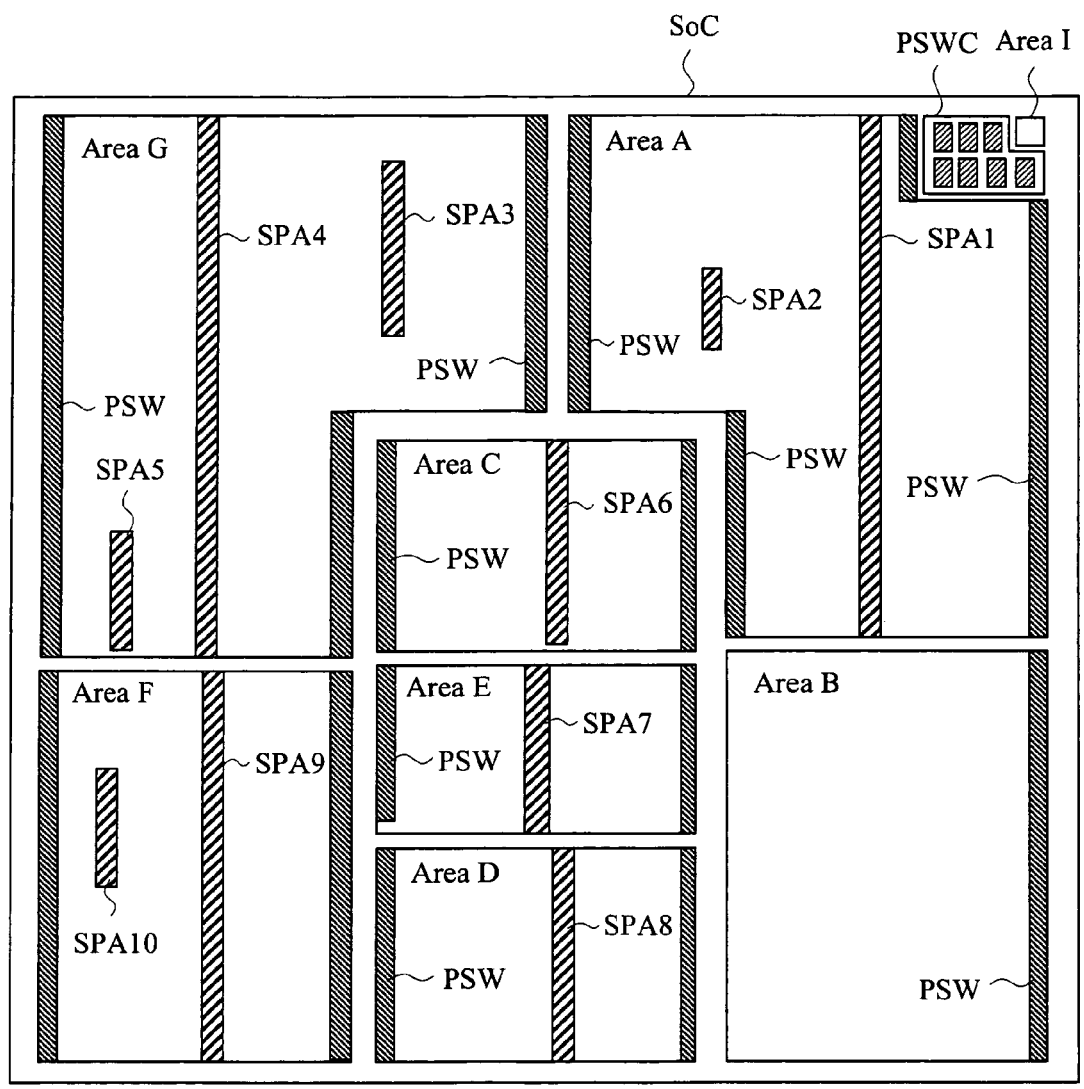
FIG. 7 is a view showing another example in the case where an independent power shutdown area is mounted on a chip in the second embodiment relating to the semiconductor integrated circuit device according to the present invention.

With reference to FIG. 6 and FIG. 7, a description will be given with respect to a second embodiment relating to a semiconductor integrated circuit device according to the present invention.

FIG. 6 is a view showing an example in which power domains described in FIGS. 1-5 are packaged on a SoC (System-on-Chip) as an example of a case in which independent power shutdown areas have been mounted on a chip. Here, there is shown an example of a division into nine power domains from Area A to Area I shown in FIGS. 1-5. In addition, in FIG. 6, small sized power domains indicated by SPA1 to SPA10 are defined as Area H. These small sized power domains are referred to as subsidiary power domains. This subsidiary power domain is provided as an independent power domain having a low power shutdown priority, as shown in the hierarchy of FIG. 1, as is evident from the fact that the area is defined as Area H. In these power domains, power is shut down in accordance with a priority rank of power shutdown as described with reference to FIG. 1.

In FIG. 6, PSW shows a power switch, and PSWC shows a power switch controller. In this SoC, it is assumed that power is shut down in areas other than Area I by means of a power switch. Basically, power supply of an internal circuit section is shut down by shutting down a power switch located at both sides of each power domain. While, the illustration is an example of providing a power switch only at one side, in Area B, it is to be understood that this invention is directed also to a circuit block having small current consumption density such as an SRAM memory. A supply current may be small in such a circuit so that the size of a power switch can be reduced.

While subsidiary power domains SPA1 to SPA10 serving as Area H will be described later in detail, power shutdown control is carried out by controlling the ON/OFF of a power switch for subsidiary power domain designed in advance in a power switch area of an independent power domain (such as Area A, for example) including the corresponding subsidiary power domain.

A subsidiary power domain solves three problems, such as, a problem with repeater application, a problem with clock buffer allocation, and a problem with latch allocation for information retaining power shutdown, with respect to four problems described in the Summary of the Invention section. As illustrated, SPA1 to SPA10 are characterized in that power domains operated by other power supply are provided in areas in which standard cells inside of power domains are generally allocated. Further, these SPA1 to SPA10 are provided as areas extending in a y direction. Although this is described in more detail later, it is known to provide a metal layer having a low resistance value and a thick wiring width in the upper layer in a fine process LSI. In many cases, packing is carried out by wiring that extends in an x direction of FIG. 6. Therefore, the subsidiary power domains SPA1 to SPA10 are designed as cells that extend in the y direction, whereby wiring is provided in a meshed shape. There is an advantageous effect that the lowered resistance of a power supply trunk can be achieved, and then, a voltage drop in the case where current consumption is high can be reduced to the minimum.

The subsidiary power domains are allocated so as to sparsely exist in each power domain. This allocation is made in order to solve the above-described three problems. First, in the case where there is a need for signal transmission to Area D from a circuit in an area, for example, Area A, a repeater signal must be passed through any one of Area B, Area C, and Area E located between Area A and Area D. However, in accordance with a power shutdown rule shown in FIG. 1, first, a signal from Area A is transmitted to Area C that falls in a "parent" of Area A. Then, the signal must be transmitted to the target Area D via Area G that falls into a "parent" of the target power domain via Area H that falls into a "parent" of Area C.

A buffer circuit called a repeater can be installed in each of these areas, and an indefinite signal propagation prevention circuit is added as required. In the case where a signal is thus transmitted, if Area H is not allocated to any one of subsidiary areas SPA1 to 4, a signal from Area G to Area D that is a target power domain must be wired without a repeater. In such a case, a signal wiring length is increased, and a load is increased. It is expected that a signal waveform is increased. Thus, an operating speed is reduced, and a waveform is dulled, wherein a penetration current flows in an input circuit to which that waveform is to be inputted. Therefore, by handling these SPA1 to 10 as Area H, a signal line can be wired in accordance with a method described in FIG. 4. As a result, reduction of signal line wiring from Area A to Area D shown in FIG. 6 to the minimum is achieved, and quality can be improved on all aspects such as operating speed and power consumption.

FIG. 7 shows another example of a method for allocating power domains shown in FIG. 6 as an example of a case in which independent power shutdown areas have been mounted on a chip. A difference from FIG. 6 is that power switch controllers are intensively allocated at one site. It is preferable that the power switch controllers to be designed by a similar MISFET in order to control a power switch using a MISFET having large gate insulation film thickness generally used in an I/O in consideration of a low leakage at the time of standby, and thus there is a need of a higher voltage power supply than in the internal logic circuit. It might be difficult to wire a power supply of this high voltage inside a SoC, because it requires revising the power wiring method or the tool used for the wiring Therefore, there is attained an advantageous effect that power supply of a high voltage is easily laid out by using the above-described allocating method.

Third Embodiment

Figure 8:
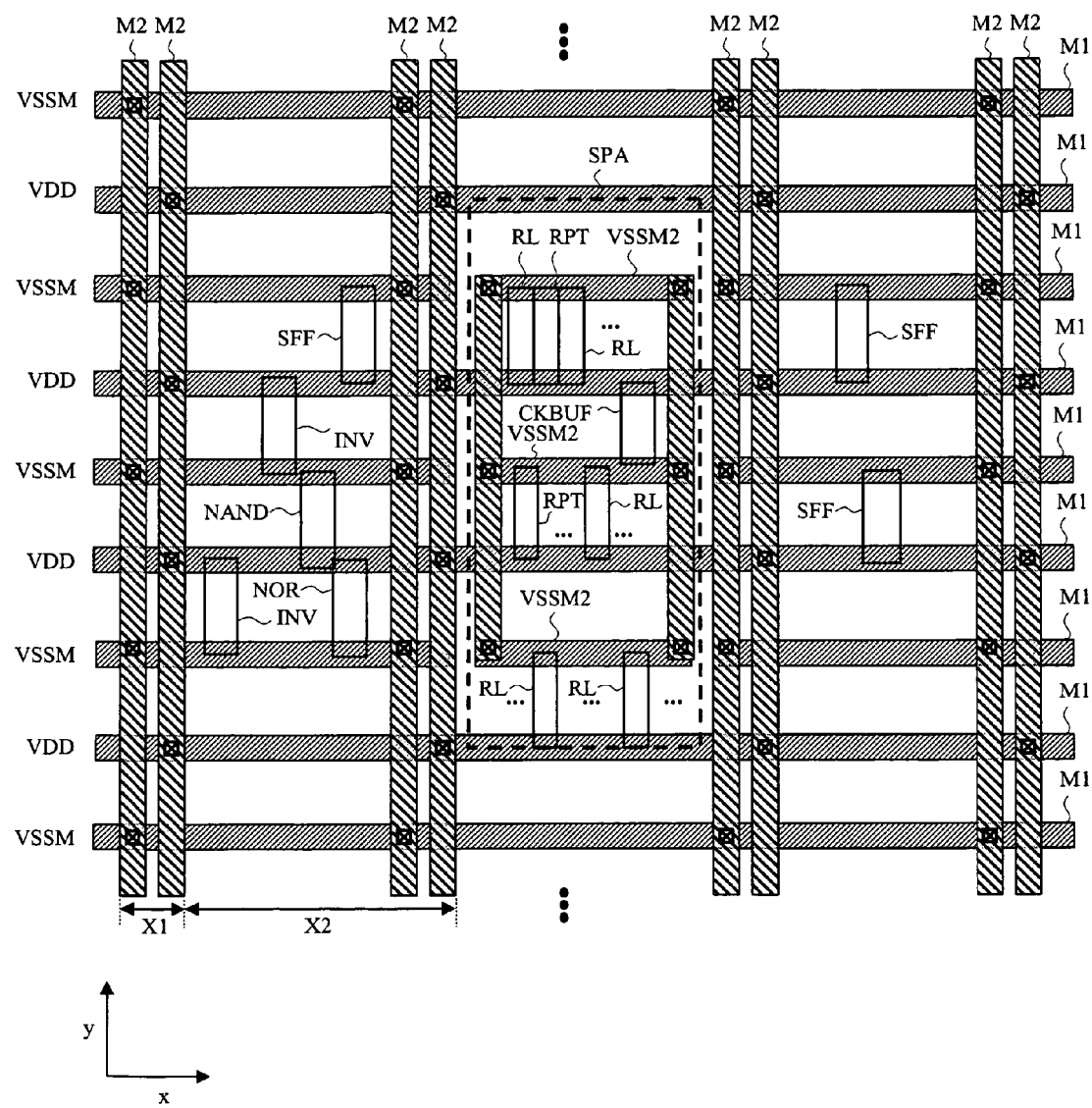
FIG. 8 is a view showing an example of a subsidiary power domain in a third embodiment relating to a semiconductor integrated circuit device according to the present invention.

With reference to FIG. 8 and FIG. 9, a description will be given with respect to a third embodiment relating to a semiconductor integrated circuit device according to the present invention.

FIG. 8 shows an example of a layout of this subsidiary power domain. In FIG. 8, wirings extending in an x direction are provided with a first metal layer Ml, and a VDD power supply VDD and a virtual ground power supply VSSM are wired. VSSM is provided as a power supply line that can be shut down from a true ground by means of a power switch described later. Hereinafter, while the present embodiment primarily describes a method for operating a circuit by using a virtual ground power supply VSSM and a VDD power supply VDD connected to a VSS power supply VSS via a switch, the present invention can be applied not only to power shutdown on such a VSS side but also to power shutdown on the VDD side similarly. In addition, the present invention can also be applied to a method for providing a power switch at both of the VDD side and VSS side.

In FIG. 8, the wiring extending in a y direction is provided with a second metal layer M2, for example, other than a first metal layer wired in an x direction. In FIG. 8, an area other than an area surrounded by the dashed line indicated as SPA corresponds to a power domain, such as Area A in FIG. 6. In this area, basic circuits, each called a standard cell, inverter circuit INV, a non-conjunction circuit NAND, a non-disjunction circuit NOR, and a standard flip flop SFF are laid out. A virtual ground power supply in an area surrounded by the dashed line indicated as SPA is provided as VSSM2, as well as a power supply independent from a virtual ground power supply VSSM in any other area. Thus, the present invention is characterized in that VSSM wiring that is ground wiring other than that in a subsidiary power domain is temporarily terminated before the subsidiary power domain and in that VSSM2 wiring is mounted in the same first metal layer in the subsidiary power domain.

VDD and VSSM are globally wired in a power shutdown area other than a subsidiary power area. Thus, regular vertical trunk lines are connected to each other, thereby reducing a resistance. An interval X2 between vertical trunk lines is optimally designed so as to have a voltage fall within a specified value when a required amount of a current is supplied at an operating speed of an internal logic circuit.

VSSM2 wiring is provided as a power supply line for supplying power to three circuits described in the Summary of the Invention section. The circuits are, a circuit of a repeater (signal amplifier circuit), a clock signal distributing buffer circuit (clock buffer), and an information retaining circuit for backing up data at the time of power shutdown of a power domain. This RL shown in FIG. 8 is provided as an information retaining latch for retaining data. This information retaining latch RL corresponds to a specific standard flip flop out of a subsidiary power domain on a one-on-one basis. In the case where power is shut down in an area other than a subsidiary power domain, this latch serves to save and store that data. CKBUF is provided as a clock buffer circuit for clock distribution, and RPT is provided as a repeater circuit (relay buffer) for long distance wiring. When passing through a plurality of independent power shutdown areas, even if such passed power domains are shut down, these elements are provided to enable application of power supply.

Here, a description will be given with respect to power supplied to a MISFET, and a description with respect to a method for designing a substrate power supply in a subsidiary power domain.

Figure 9A:
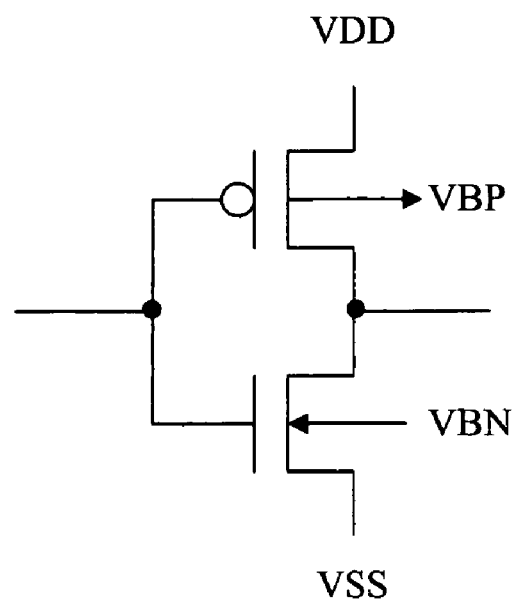
FIG. 9A is a view showing an example of illustration of a power supply terminal of a constituent circuit in the third embodiment relating to the semiconductor integrated circuit device according to the present invention.
Figure 9B:
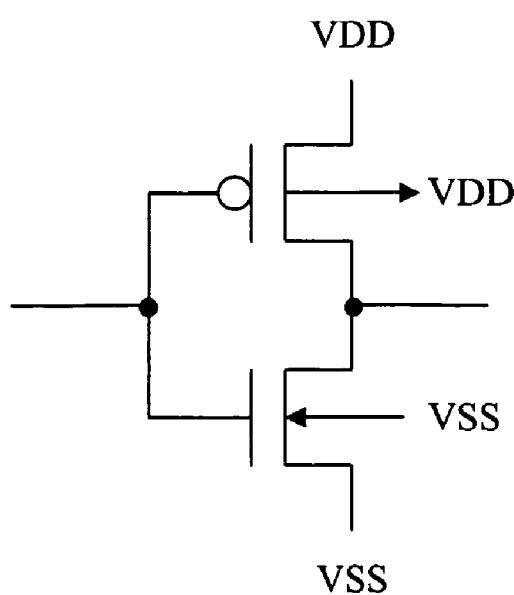
FIG. 9B is a view showing an example of illustration of a power supply terminal of a constituent circuit in the third embodiment relating to the semiconductor integrated circuit device according to the present invention.

As an example, FIGS. 9A and 9B each show a power supply of a MISFET of a general inverter circuit. FIG. 9A, shows an example of connecting another power supply to each of a source electrode and a substrate electrode of an N-type MISFET and a P-type MISFET. Namely, VSS is connected to the source electrode of the N-type MISFET, and VBN of the N-type MISFET is connected to the substrate electrode. VDD is connected to the source electrode of one P-type MISFET, and VBP of the P-type MISFET is connected to the substrate electrode. This type of connection is referred to as a substrate separating type.

FIG. 9B, shows an example of connecting another power supply to each of a source electrode and a substrate electrode of an N-type MISFET and a P-type MISFET. Namely, VSS is connected to the source electrode of the N-type MISFET. VDD is connected to the source electrode and the substrate electrode. This type of a connection is hereinafter referred to as a substrate integrated type.

At the time of arranging N-type MISFETs applied with different types of power supplies at which power shutdown is carried out independently, it is possible to easily integrate N-type MISFETs that are operated by two power supplies by fixing substrate power supplies in a substrate separation type circuit to a common ground. On the other hand, at the time of arranging such N-type MISFETs with two types of independent power supplies, in the case of a substrate integrated circuit, it is necessary to separate the substrate power supplies in a substrate power domain and any other area. It is necessary to separate wells in order to separate substrate power supplies.

FIG. 8 shows an example in which a subsidiary power domain requires a well separation area because a power shutdown mechanism caused by an N-type MISFET is assumed to be composed of a substrate integrated circuit. In this example, it is presumed that a well separation area is provided under a vertical power supply trunk line located at both sides of a subsidiary power domain. The well separation area introduced here will be described in detail in FIG. 11. In an N-type well required for well separation, a P-type MISFET can be integrated in that area, and this P-type MISFET can be used as a capacitance element for stabilizing power. Therefore, this well separation area can be efficiently utilized, and there is attained an advantageous effect in overhead reduction as well.

Fourth Embodiment

Figure 10:
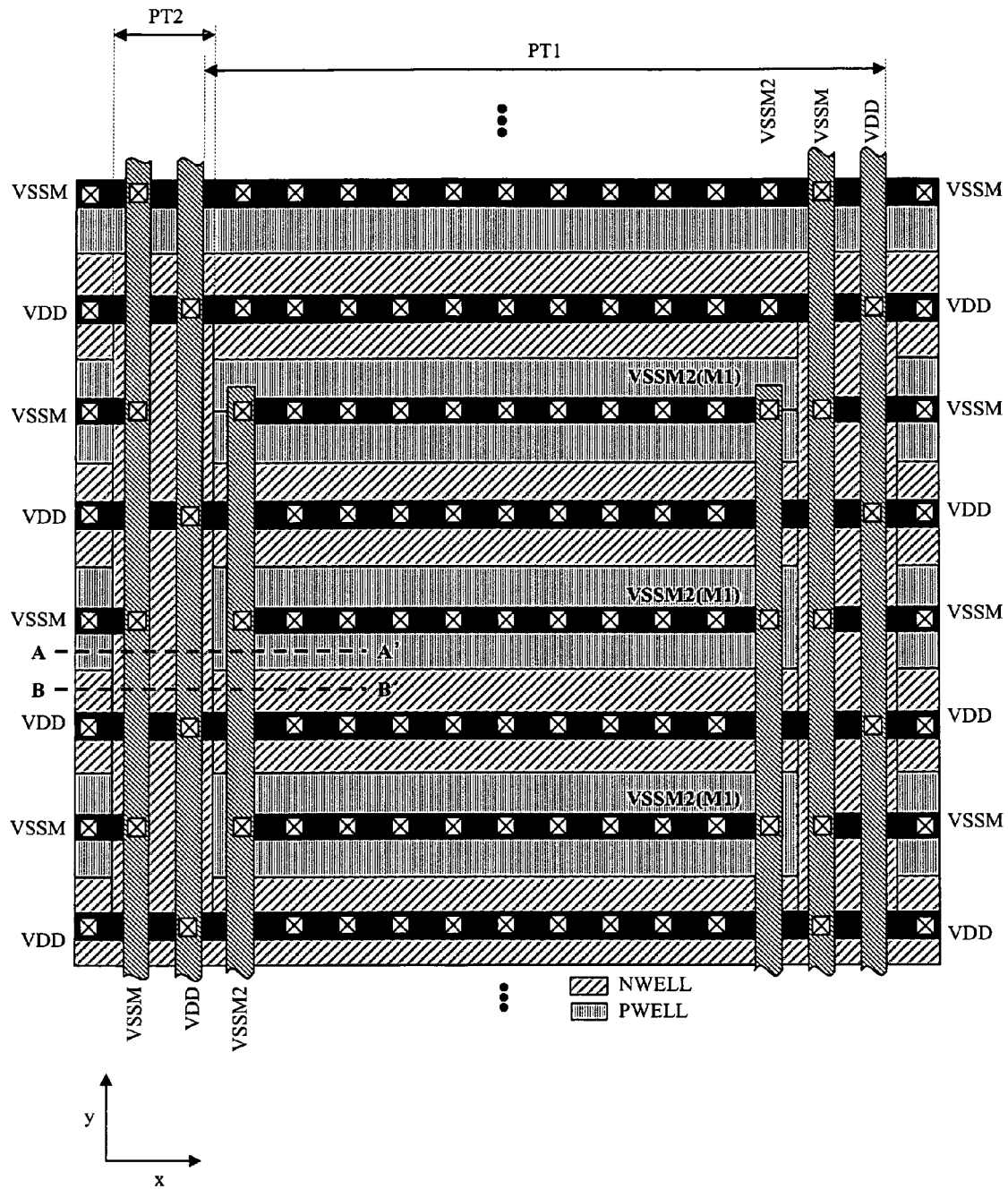
FIG. 10 is a view showing an example of a layout of a subsidiary power domain in a fourth embodiment relating to a semiconductor integrated circuit device according to the present invention.

With reference to FIG. 10 and FIG. 11, a description will be given with respect to a fourth embodiment relating to a semiconductor integrated circuit device according to the present invention.

FIG. 10 shows an example of a layout achieving FIG. 8 as an example of a layout of subsidiary power domains. This example shows an example of the case where a grounding power supply is shut down. While a method for shutting down a grounding power supply is described later, this method is easily applied in the case where power is shut down at a VDD power supply side. In that case, in consideration of a double-well configuration on a P-type silicon substrate, as one of the technique well known by those skilled in the art, so that VDD and VSS are reread, a P-type MISFET and an N-type MISFET and a P-type well PWELL and an N-type well NWELL may be replaced respectively. Alternatively, while an area OH is increased, even a triple-well construction can be easily applied so as to electrically separate a deep N-type well (DNW).

This layout assumes a layout which is provided in substrate integrated standard cells, as shown in FIG. 9B, and it is necessary to separate an N-type MISFET in which power is to be shut down and an N-type MISFET in which no power is supplied. Thus, in FIG. 10, an N-type well NWELL is provided for separating substrates of these two types of N-type MISFETs from each other, and two types of N-type MISFETs are laid out. A well for separating this substrate electric potential is an N-type well, so that a P-type MISFET can be integrated in this area. Therefore, a P-type MISFET is integrated as a capacitance element in this area, thereby making it possible to efficiently utilize this area. An area other than this well separation area can be filled with general standard cells. The same standard cell library can be used in a respective one of an area in which the grounding power supply is VSSM and an area in which the grounding power supply is VSSM2.

In addition, although it is not necessary to provide a well separation area by using substrate separation type cells shown in FIG. 9A, there is a need for new wiring to provide a substrate power supply. In the case where a metal wiring layer can be used as one layer inside of standard cells, substrate power wiring may be carried out by using the metal wiring layer. Alternatively, in the case where such a metal wiring layer cannot be used, it is possible to use a diffusion layer by producing the layer as silicide, thereby reducing a resistance. In this case, a silicide diffusion layer is higher in resistance than metal wiring, and thus, countermeasures, such as reducing a mesh interval for reinforcing metal wiring, may be taken.

In FIG. 10, PT1 indicates pitch intervals of vertical trunk lines, and PT2 indicates a well separating area. PT1 is provided as an area for locating a subsidiary power domain. This area can have a width which is an integral multiple of PT2.

Figure 11A:
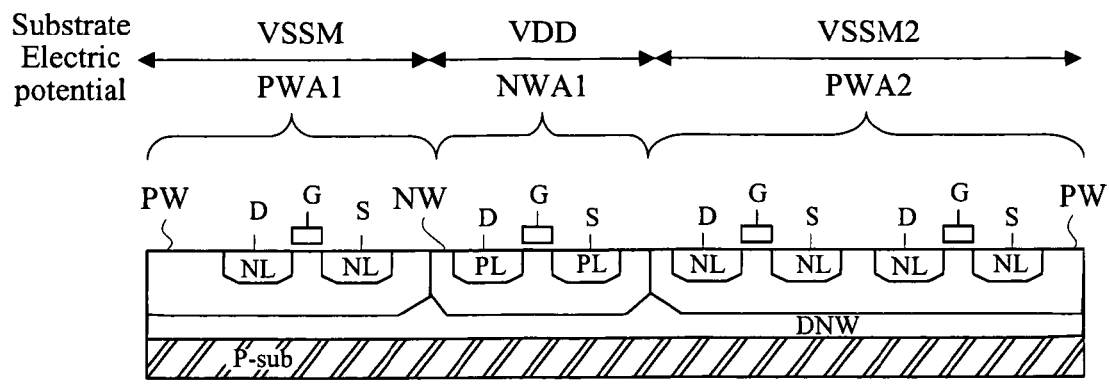
FIG. 11A is a view showing an example of a cross section in the vicinity of the subsidiary power domain in the fourth embodiment relating to the semiconductor integrated circuit device according to the present invention.
Figure 11B:
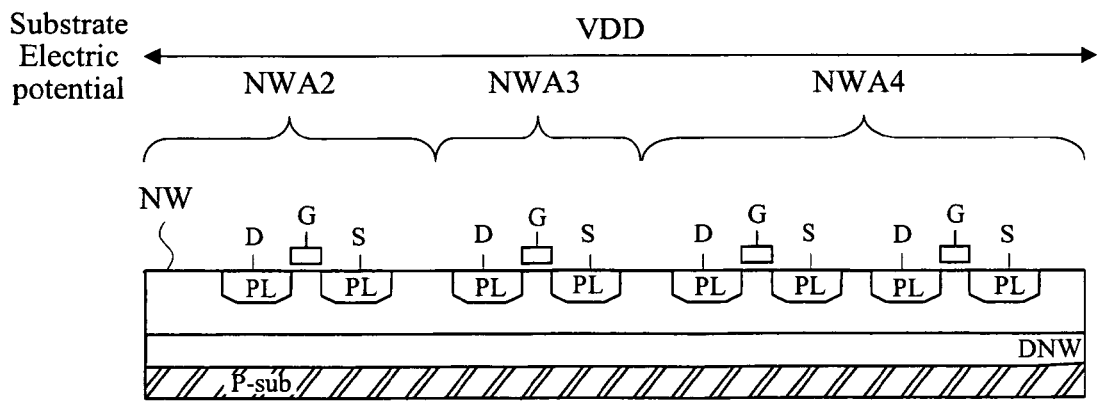
FIG. 11B is a view showing an example of a cross section in the vicinity of the subsidiary power domain in the fourth embodiment relating to the semiconductor integrated circuit device according to the present invention.

FIGS. 11A and 11B each show an example of a cross section taken along the line A-A' and a cross section taken along the line B-B' shown in FIG. 10 as an example of cross sections in the vicinity of a subsidiary power domain. Although shown in the description of FIG. 10, when a subsidiary power domain is designed in substrate integrated standard cells, there is a need for well separation. FIGS. 11A and 11B each show the well separation. FIG. 11A shows that power separation is carried out with a P-type well area (PWA1) in which VSSM is applied to a substrate and a source and in a P-type well area (PWA2) in which VSSM2 is applied to a substrate and a source while an N-type well area (NWA1) is sandwiched therebetween. Here, a triple-well configuration is considered.

In the triple-well configuration used here, a deep N-type well (DNW) is deeply produced on a P-type silicon substrate (P-sub) on which a P-type diffusion layer and an N-type diffusion layer (NL) are fabricated. In such a configuration, as shown in FIG. 11, the N-type well is sandwiched, thereby making it possible to separate a substrate power supply of an N-type MISFET produced in an area of the P-type well. This method can minimize an area increase for separating a substrate electric potential. Here, with respect to the area of the N-type well (NW) for carrying out power separation, the N-type well is continuous in a y direction, as shown in FIG. 10. Thus, this area is provided as an area in which general standard cells cannot be located. Therefore, in order to efficiently utilize such an area, a P-type MISFET is configured in this N-type well area, and this P-type MISFET is used as a power stabilizing capacitance element. In this manner, there is attained an advantageous effect that a dead space can be efficiently utilized.

In each MISFET, D denotes a drain electrode, S denotes a source electrode, and G denotes a gate electrode.

FIG. 11B shows that MISFET is configured by the N-type well, in which VDD is applied to a substrate, and a source. NWA2 and NWA 4 are ordinary standard cell areas, and NWA3 is an area used as the well separation area. Here, a triple-well configuration is considered. Here, NWA3 is an area of N-type well (NW), while N-type well is continuous in a y direction, as shown in FIG. 10. Thus, this area is provided as an area in which general standard cells cannot be located. Therefore, in order to efficiently utilize such an area, a P-type MISFET is configured in this N-type well area, and this P-type MISFET is used as a power stabilizing capacitance element. In this manner, there is attained an advantageous effect that a dead space can be efficiently utilized.

Fifth Embodiment

Figure 12:
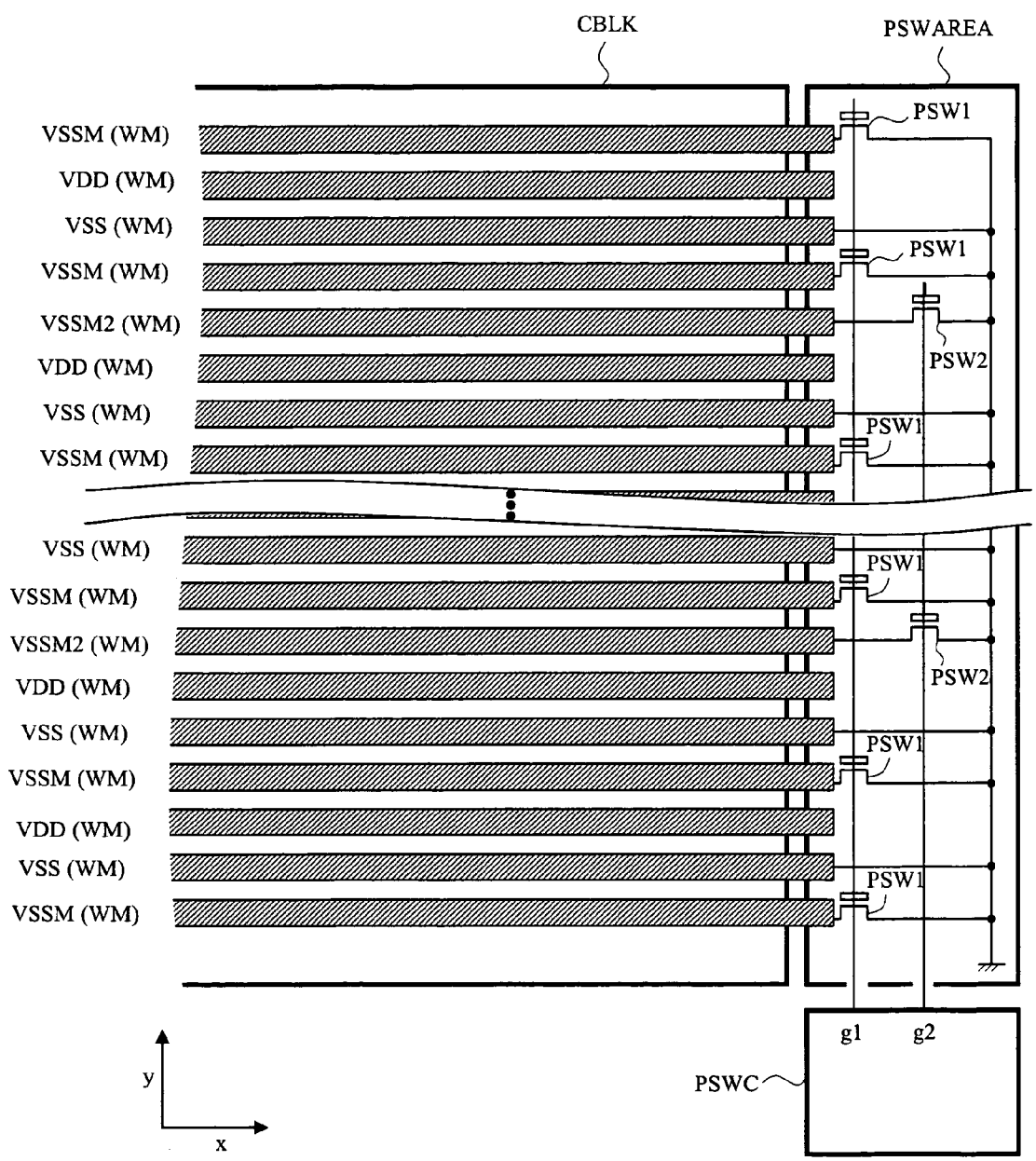
FIG. 12 is a view showing an example of connection between a power supply wiring and a power switch in a fifth embodiment relating to a semiconductor integrated circuit device according to the present invention.

With reference to FIG. 12, a description will be given with respect to a fifth embodiment relating to a semiconductor integrated circuit device according to the present embodiment.

FIG. 12 shows an example of a layout of power switch allocation and power supply wiring for achieving power supply in a subsidiary power domain as an example of power supply wiring and power switch connection. In FIG. 12, there are provided: a circuit block CBLK that is an independent power domain; a power switch allocation area PSWAREA for shutting down power supply of a circuit in that CBLK; and a power switch controller PSWC for controlling that switch. In order to reduce a resistance of a power supply line by means of the recent micro scaled LSI, there is attained an advantageous effect that the low resistance of the power supply line can be achieved by allocating metal wiring in the upper layer to a power supply.

FIG. 12 shows an example in which power supply wiring is provided in an x direction in the upper layer of CBLK. In that case, it is effective to provide the metal wiring so that number of VDD power supplies, VSS power supplies, and VSSM power supplies are as close to each other as possible in order to achieve a low resistance of the whole power supply wiring. This wiring is composed of a metal layer having a large wiring width, and is referred to as a wide metal wiring layer (WM). Upon wiring VSSM2 that is a power supply to a subsidiary power domain, there is a need for wiring a VSSM2 power supply that is a power source in a subsidiary power domain at a rate depending on the size of the subsidiary power domain. At this time, while maintaining a group of three power supplies of VDD, VSS, and VSSM, VSSM2 power supplies are wired at specific intervals, thus making it possible to wire a VSSM2 power supply without degrading a low resistance of a power supply wire.

The VSSM power supply and VMMS2 power supply are connected to power switches allocated at both sides of this power shutdown area, and the connected power supplies are controlled by means of a control signal from a power switch controller. A power switch PSW1 is used for connection between the VSSM power supply line and the VSS power supply, and a power switch PSW2 is used for connection between the VSSM2 power supply and the VSS power supply. The respective power switches are controlled by means of gate drive signals g1 and g2 outputted from the power switch controller PSWC.

Sixth Embodiment

Figure 13A:
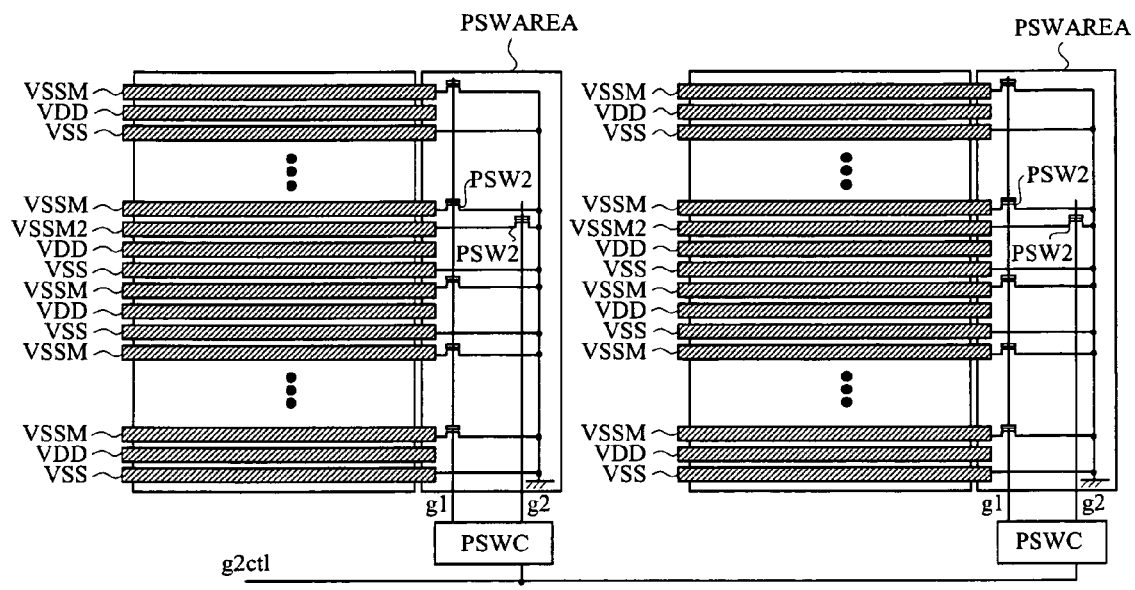
FIG. 13A is a view showing an example of a configuration in the case where a plurality of independent power shutdown areas exist in a sixth embodiment relating to a semiconductor integrated circuit device according to the present invention.
Figure 13B:
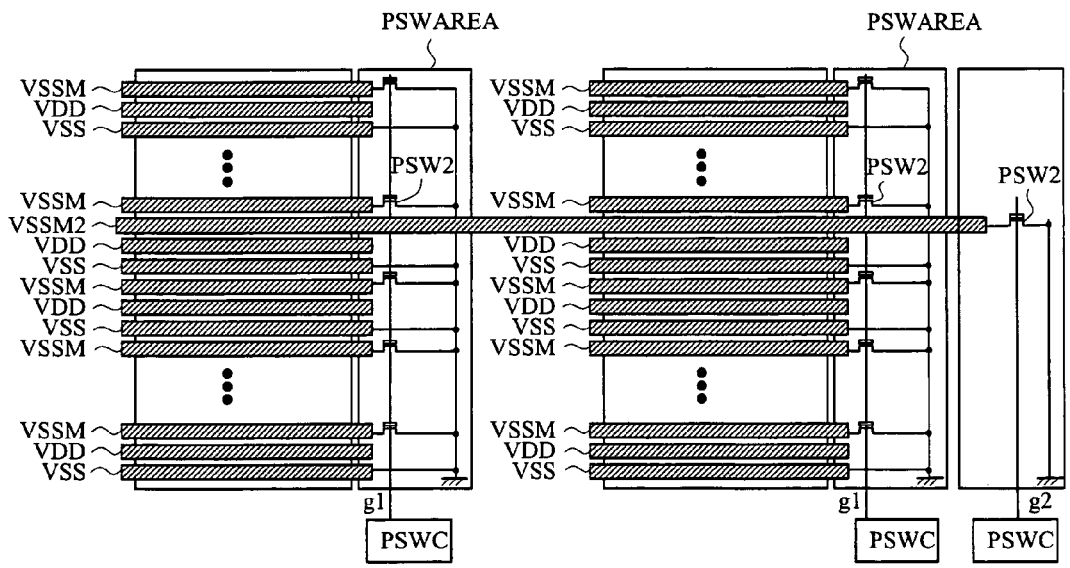
FIG. 13B is a view showing an example of a configuration in the case where a plurality of independent power shutdown areas exist in a sixth embodiment relating to a semiconductor integrated circuit device according to the present invention.

With reference to FIG. 13A and FIG. 13B, a description will be given with respect to a sixth embodiment according to a semiconductor integrated circuit device according to the present invention.

FIGS. 13A and 13B are views showing an example of arranging a power switch for respective independent power shutdown areas and a power switch for a subsidiary power domain as one example of a configuration in which a plurality of independent power shutdown areas exist.

FIG. 13A illustrates an exemplary case in which control of a power switch in a subsidiary power domain is also carried out independently in a power switch controller for controlling two independent power domains. It is desirable that VSSM2 power supplies serving as grounding power supplies in a subsidiary power domain to be used in common in a plurality of power domains in order to facilitating a control operation and to achieve a low impedance of power supply wiring. In that case, it is desirable to control in common these VSSM2 power supplies by means of a power switch controller that corresponds to each power domain on a one-on-one basis. Therefore, in FIG. 13A, it is shown control of a g2 signal from power switch controllers in all areas by means of a common control signal g2*ctl* inputted to each power switch controller PSWC and a power switch PSW2 for shutdown control of the VSSM2 power supply. Through such a control, there is attained an advantageous effect that an impedance of power supply wiring of the VSSM2 power supply can be reduced.

FIG. 13B shows an example in which a power switch and its power controller in a subsidiary power domain are provided independently. In this way, there is attained an advantageous effect that integrated management of VSSM2 of virtual ground power line in the subsidiary power domain in the upper wide metal wiring layer is facilitated. In this case, it is desirable to achieve a low resistance by wiring all of the VSSM2 power supplies with the wide metal wiring layer. A method for allocating each of VDD, VSS, VSSM, and VSSM2 with the wide metal wiring layer may be carried out in the same manner as that shown in FIG. 13A.

Seventh Embodiment

Figure 14:
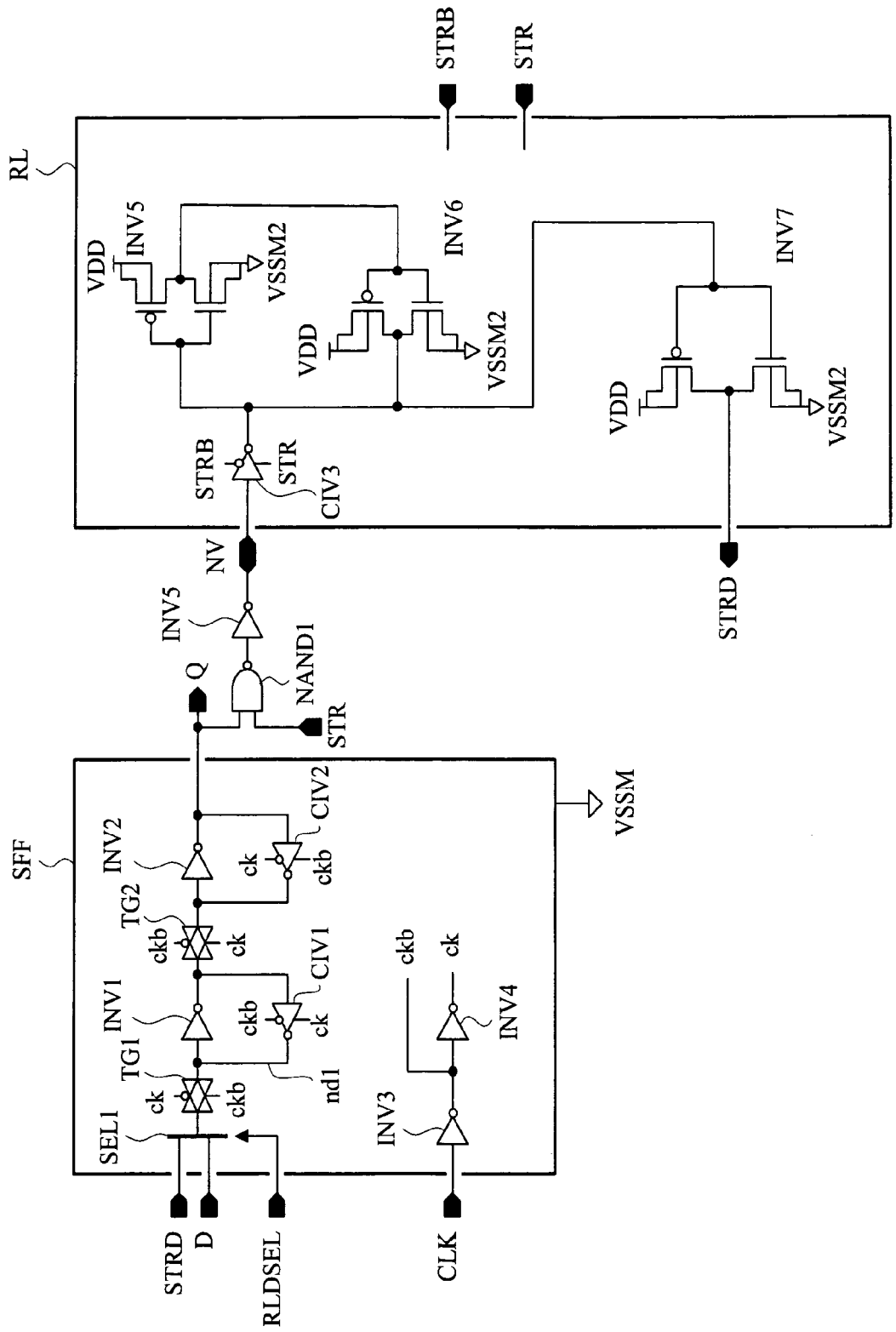
FIG. 14 is a view showing an example of a circuit configuration of a standard flip flop and an information retaining latch in a seventh embodiment relating to a semiconductor integrated circuit device according to the present invention.
Figure 15:
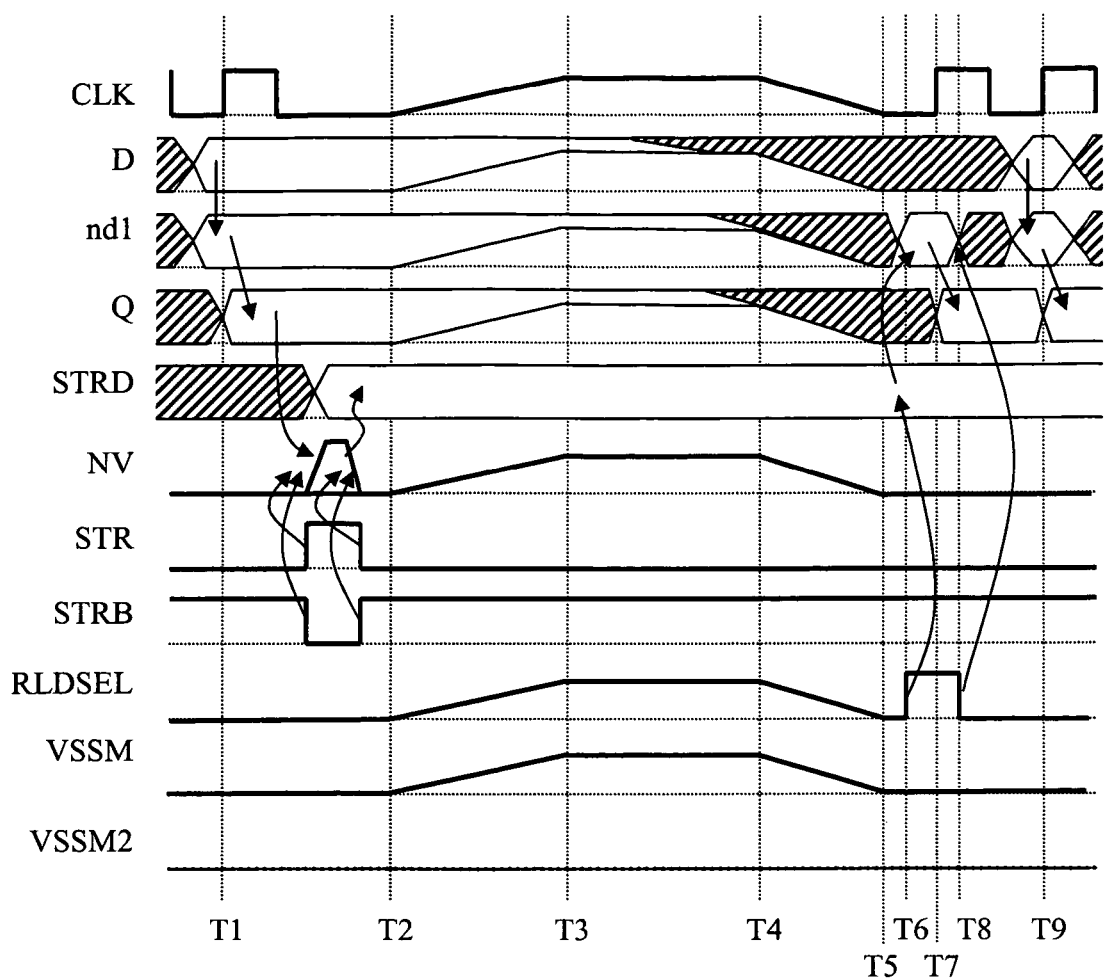
FIG. 15 is a view showing an example of an operating waveform of a standard flip flop and an information retaining latch in a seventh embodiment relating to a semiconductor integrated circuit device according to the present invention.

With reference to FIGS. 14 and 15, a description will be given with respect to a seventh embodiment of a semiconductor integrated circuit device according to the present invention.

FIG. 14 shows an example of circuits of a standard flip flop and an information retaining latch as an example of a circuit configuration of these constituent elements. A standard flip flop SFF is composed of: transmission gates TG1 and TG2; inverters INV1 to INV4; clocked inverters CIV1 and CIV2 or the like. This flip flop has an additional function as a general parent/child type flip flop while it also has a selector SELL for switching a general input and an output from the information retaining latch RL. This SFF is provided as a circuit in an independent power shutdown area. Thus, a ground power supply VSSM is applied thereto. There are provided terminals of an input signal D, an output signal Q, and a clock signal CLK; an input signal STRD from the information retaining latch; and further, a selector signal RLDSEL to control a selector for switching a general operation input and an input from the information retaining latch. A signal from SFF to RL is controlled by means of an STR signal while a non-conjunction circuit NAND1 is provided partway, and, in the case where SFF data is retained in RL, control for achieving Lo is carried out.

The information retaining latch RL mounted in a subsidiary power domain receives save data from SFF by the clocked inverter CIV3. The received data is retained by means of a latch composed of internal inverters INV5 and INV6. This control is carried out by means of a data save signal STR and the inversion signal STRB. An output signal from RL is outputted from an inverter INV7 by means of STRD, and the outputted signal is then inputted to a terminal of STRD from a retaining latch of SFF.

A power supply configuration of MISFETs of these circuits will be described next. In P-type MISFETs, each of source side electrodes and substrate electrodes is provided as VDD similarly in each of their respective areas. On the other hand, N-type MISFETs are different from each other in each area. A source electrode and a substrate electrode (grounding side power supply) of an N-type MISFET of SFF are provided as VSSM, and a source electrode and a substrate electrode (grounding power supply) of an N-type MISFET of RL are provided as VSSM2. Here, a substrate integrated type circuit is assumed.

FIG. 15 shows an example of operating waveforms of a standard flip flop and an information retaining latch. FIG. 15 also shows, from the top, a clock signal CLK, an input signal D to SFF, a signal of an internal node nd1, n output signal Q of SFF, an input signal STRD from RL, a signal of a node NV to RL, a data save signal STR, a data save signal inversion signal STRB, a selector signal RLDSEL of the input signal D, a VSSM power supply, and a VSSM2 power supply.

First, at a time T1, a general operation of a flip flop is carried out. In this case, an input signal D is captured at a rise of a clock signal CLK; the captured signal is transmitted to an internal node nd1 as it is by means of a selector; and an output signal Q is updated and retained.

Starting a power shutdown will be described next. Prior to power shutdown, it is necessary to transfer the data in SFF to an information retaining latch RL. In this case, a data save signal STR is set at Hi, and a data save signal inversion signal STRB is set at Lo, whereby an output signal Q is transmitted to a node NV via NAND for connecting the output signal Q to the node NV. Then, STR is set at Lo, and STRB is set at Hi, whereby signal transmission between SFF and RL is shut down, and data is retained in RL. Then, a power shutdown switch is turned OFF at a time T3. When the power shutdown switch is turned OFF, a level of a virtual ground power supply VSSM rises, and power shutdown almost completes at a time T3. Although the internal data of SFF is destroyed, the data retained in RL is retained as it is.

A description will be given with respect to recovery from power shutdown. A level of a virtual ground power supply VSSM is set to 0V by turning ON a power shutdown switch at a time T4. Then, when power is completely turned ON at a time T5, and then, RLDSEL is set at Hi at a time T8, STRD data is transmitted to nd1. Then, nd1 data is captured at a rise of a clock, and an output signal Q is updated and retained.

Then, a general input is selected by setting RLDSEL at Lo. Subsequently, an operation for retaining an input signal D at a rise of a clock is carried out.

Eighth Embodiment

Figure 16:
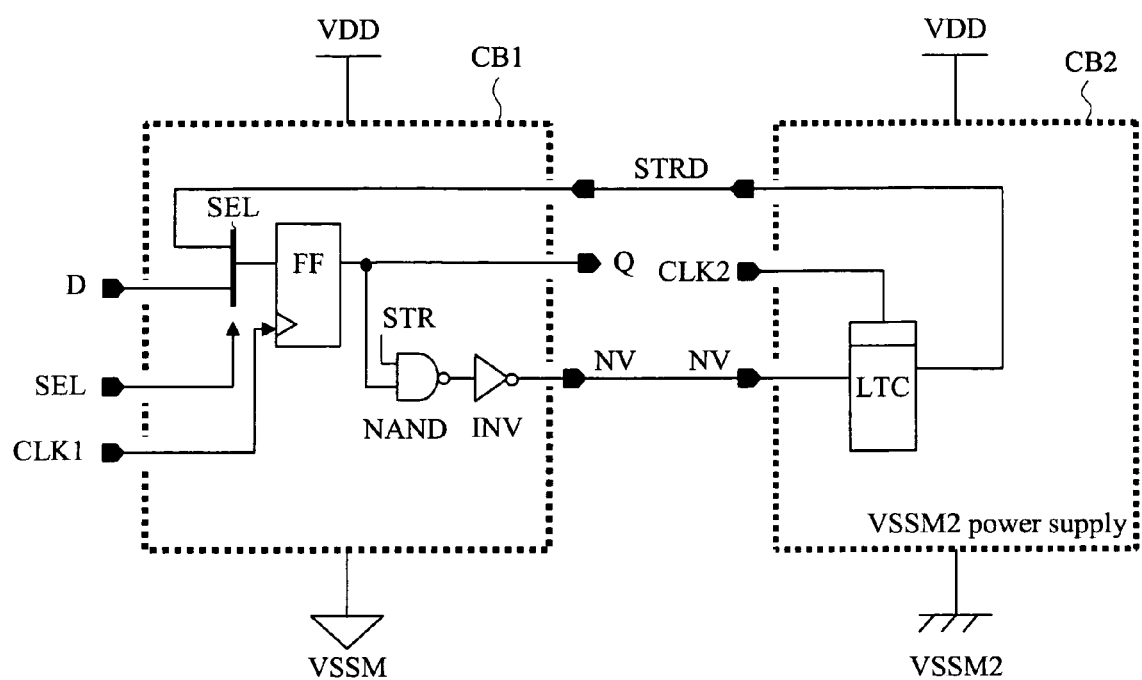
FIG. 16 is a view showing another example of a circuit configuration of a standard flip flop and an information retaining latch in an eighth embodiment relating to a semiconductor integrated circuit device according to the present invention.

With reference to FIG. 16, a description will be given with respect to an eighth embodiment relating to a semiconductor integrated circuit device according to the present invention.

FIG. 16 shows an example of a circuit configuration of an information retaining latch other than FIG. 14 showing the information retaining circuit provided in the subsidiary power domain. FIG. 16 shows using general flip flop FF and latch LTC registered in standard cells. There are provided a circuit block CB1 at a side at which power is shut down and a circuit block CB2 for retaining information by power supply in the case where CB1 is shutdown from power supply.

CB1 is composed of: a flip flop FF for retaining information at the time of power shutdown; a selector SEL for selecting an input signal D and an input signal (data) STRD from CB2; a non-conjunction circuit NAND for transmitting data to CB2; and an inverter circuit INV. CB2 is composed of a latch LTC for retaining the retained data from CB1. CB1 and CB2 can use the same standard cells, although the grounding side powers supplied are different from each other here. An operation of the data retaining circuits (FF and LTC) in CB1 and CB2 is normal, and data is captured in FF in synchronism with a clock signal CLK1, and LTC at the side of CB2 retains data in the case where a value of a clock signal CVLK2 is set at Hi. In this way, there is attained an advantageous effect that CB1 circuit power shutdown is facilitated without newly producing standard cells.

Ninth Embodiment

Figure 17A:
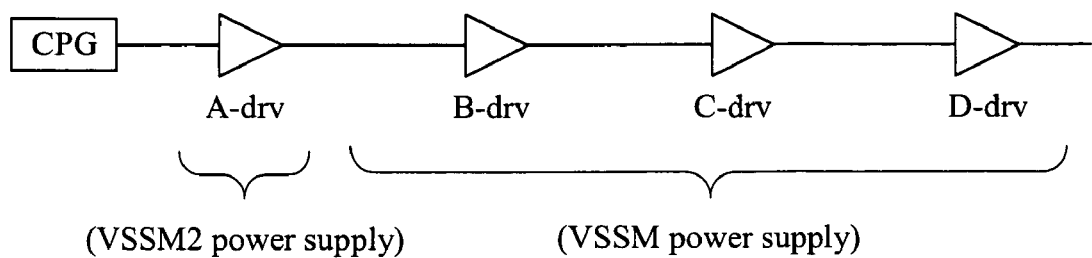
FIG. 17A is a view showing an example of a configuration of a clock buffer mounted in a subsidiary power domain in a ninth embodiment relating to a semiconductor integrated circuit device according to the present invention.
Figure 17B:
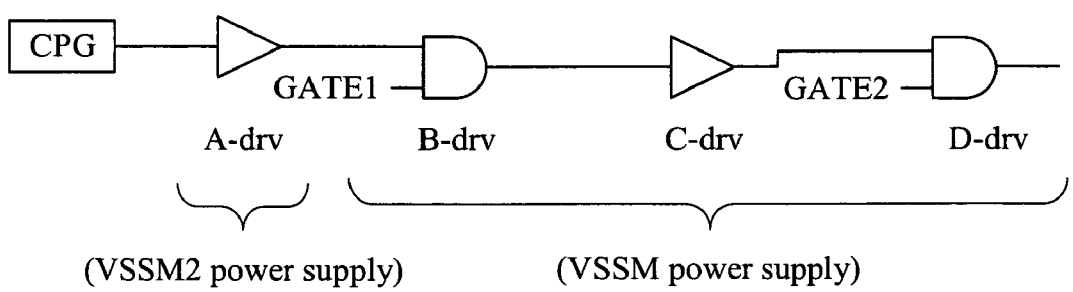
FIG. 17B is a view showing an example of a configuration of a clock buffer mounted in a subsidiary power domain in a ninth embodiment relating to a semiconductor integrated circuit device according to the present invention.

With reference to FIGS. 17A and 17B, a description will be given with respect to a ninth embodiment relating to a semiconductor integrated circuit device according to the present invention.

FIGS. 17A and 17B are views showing an example of a configuration of a clock buffer mounted in a subsidiary power domain. FIG. 17A shows a connection configuration of a general clock distributing system. A block buffer is provided as a circuit for distributing clock pulses generated from a clock pulse generator CPG. In general, a clock is distributed to a whole chip via some stage of these buffers. Here, there is shown an example in which clocks are roughly distributed in four hierarchies of a first stage clock buffer group (A-drv); a second stage clock buffer group (B-drv); a third stage clock buffer group (C-drv); and a last stage clock buffer group (D-drv). The word "four hierarchies" used here does not imply distribution by four clock buffers, but implies that a clock buffer category is roughly divided into four groups. Therefore, a plurality of clock buffer can be buffered in each hierarchy. For example, the clock buffer A-drv can be transmitted to the clock buffer B-drv via the second stage buffer circuit.

In the case where a plurality of power shutdown areas is mounted on a chip, there is a problem with how to locate a clock distributing circuit. Here, this problem is solved by mounting in a subsidiary power domain some buffers in hierarchy A which serves to distribute a clock to the whole chip. By doing so, the number of clock buffers mounted in the subsidiary power domain can be decreased, making it possible to contribute to leakage current reduction at the time of the chip standby.

FIG. 17B shows a modified example of FIG. 17A. In this example, a block gating technique is applied to a buffer hierarchy provided partway. This example also shows an example in which clock gating has been applied to B-drv and D-drv. An output of B-drv is fixed to Lo by setting a gating signal GATE1 of B-drv at Lo. When GATE1 is set at Hi, a clock signal propagates. Similarly, an output of D-drv is fixed to Lo by setting a gating signal GATE2 of D-drv at Lo. When GATE2 is set at Hi, a clock signal propagates. A control of this gate signal must be achieved so as to be identical to that in a power supply hierarchy of a power domain in which a clock buffer is mounted or must be achieved through the upper power supply hierarchy. Otherwise, there is a danger that a penetration current is generated at a clock gating circuit.

Tenth Embodiment

Figure 18:
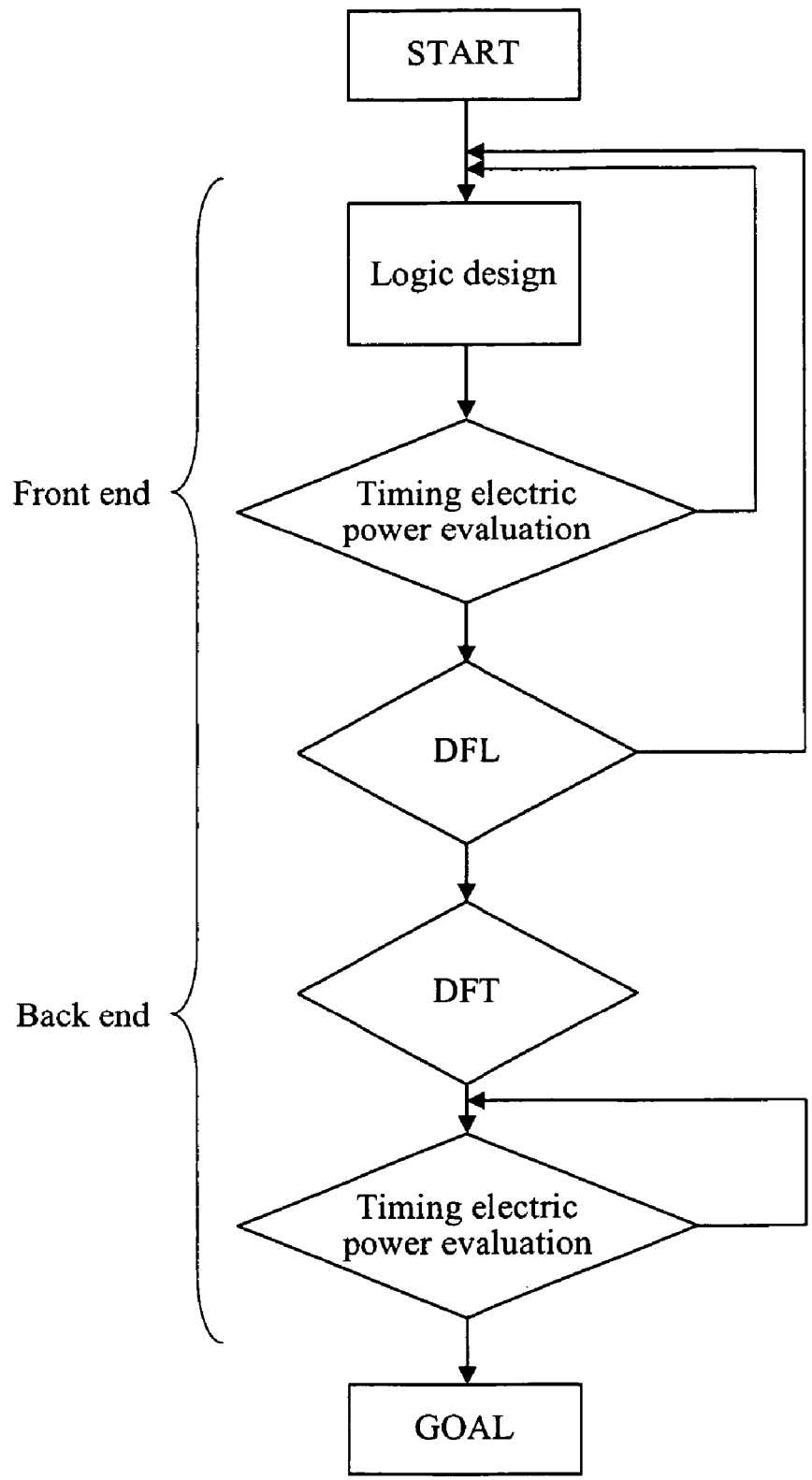
FIG. 18 is a view showing an example of design flow of a semiconductor integrated circuit device in a tenth embodiment relating to a semiconductor integrated circuit device according to the present invention.

With reference to FIG. 18, a description will be given with respect to a tenth embodiment of a semiconductor integrated circuit device according to the present invention.

FIG. 18 is a view showing an example of a design flow of a semiconductor integrated circuit device. This embodiment is characterized in that the step of DFL (Design for Leakage) is newly provided. This step assumes an operating method in which SoC to be manufactured is actually used, and carries out a check of a leakage current quantity in the case where a power supply other than a portion required for operation is shut down. A leakage current is evaluated in this step assuming a use scene, and reasonability for allocation of a power supply domain is considered.

By incorporating such a step, a plurality of independent power supply domains in a chip is provided, thereby making it possible to design a leakage current quantity. In order to carry out this step, cooperation of a front end (logic design and timing electric power evaluation) and a back end (layout design, DFT (Design for Test), and timing electric power evaluation) becomes more important than those of the prior steps. This is because it is necessary to fully consider whether or not logic specification discussed at the front end conforms to electric power specification required from customers, and at the same time, physical allocation information (such as power supply domain allocation or signal line repeater allocation) is important.

In the case where the evaluated leakage current exceeds a target value, power supply domain reconfiguration is carried out, and a network change or the like is fed back to a logic design based on a result of that evaluation. In this manner, in consideration of a total leakage current quantity of a chip, it becomes possible to make a design while checking whether or not the leakage current quantity is within the specification.

Eleventh Embodiment

With reference to FIGS. 19-22, a description will be given with respect to an eleventh embodiment relating to a semiconductor integrated circuit according to the present invention.

Figure 19:
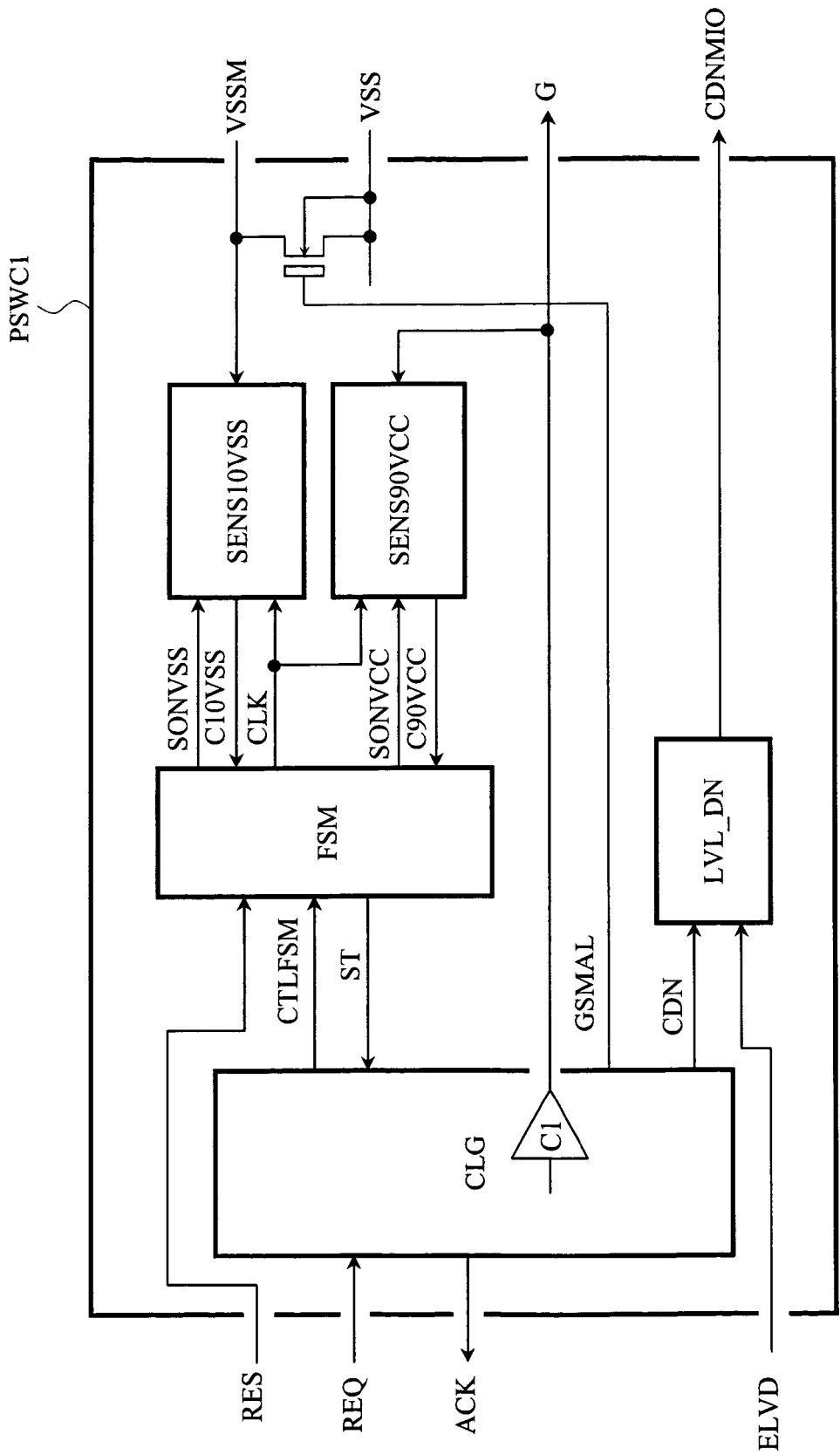
FIG. 19 is a view showing an example of a power switch controller in an eleventh embodiment relating to a semiconductor integrated circuit device according to the present invention.

FIG. 19 is a view showing an example of a power switch controller. This power switch controller is composed of a MISFET having large gate insulating film thickness used in I/O, and an operating power supply operated by means of VCC (3.3V, for example) and VSS. This is because this MISFET is designed so a to be operated by means of a high VCC power supply as compared with a VDD power supply, thus making it possible to increase setting of a threshold value and to reduce a sub-threshold leakage current. Further, there is attained an advantageous effect that gate insulating film thickness is large, thus making it possible to reduce a gate tunnel leakage current.

This power switch controller PSWC1 is composed of: a control logic circuit CLG; a finite state machine FSM; a sensor circuit SENS10VSS of a VSSM level; a sensor circuit SENS90VCC of a gate signal level of a power switch; a level converter circuit LVL_DN for generating a micro I/O control signal; and a small sized power switch. SENS10VSS is driven by means of a control signal SONVSS, and transmits a detection completion signal C10VSS at a time point at which a VSSM level is set at 10% VDD. SESN90VDD is driven by means of a control signal SONVSCC and transmits a detection completion signal C90VCC at a time point at which a level of a gate signal G of a power switch is set at 90% VCC. In FSM, based on information from each sensor circuit, control of a power switch is carried out. While CLG carries out control of a micro I/O, this micro I/O is composed of a MISFET having a thin gate insulating film which is operated by means of a VDD power supply and a VSS power supply. Thus, a signal CDN of a VCC amplitude is converted into a micro I/O control signal CDNMIO through a level converter circuit, and the converted signal is outputted.

A synchronizing type comparator synchronized with a clock signal is used for each sensor circuit of a voltage level. Thus, this voltage sensor senses a voltage level while dynamically repeating clock supply from FSM to each voltage sensor and a comparison with a pre-charge by means of a clock signal. This clock may be oscillated inside of FSM by using a ring oscillator or the like.

This power switch controller PSWC1 operates an internal control circuit and drives a power switch when the controller has received a request signal REQ. A method for controlling the power switch uses a two-stage switch size switching type of switching and driving a small size power switch and a large size power switch. In this way, a mass current called an inrush current for electrically discharging a VSSM level can be reduced. In this system, the small size switch functions as a switch for feeding an inrush current at the time of electrically discharging a VSSM level, thus making it possible to restrict the inrush current by properly selecting the size of this power switch.

Now, a description of an operation will be given here. First, when a request signal REQ is inputted, a control logic circuit CLG transmits a startup signal to a finite state machine FSM. This FSM transmits a state of a power switch by means of a signal ST based on sense signals from a sensor circuit SENS10VSS for measuring a voltage level of a virtual power supply line VSSM and a sensor circuit SENS90VCC for measuring a voltage level of a gate signal G of a power switch. In the case where that ST indicates a state of driving, a large size switch CLG starts driving a large size driver C1. Further, when SENS90VCC detects that a gate signal G of a power switch exceeds 90% VCC, FSM moves to a state in which power has been turned ON. In the case where there is indicated a state in which a power switch has been turned ON by means of a signal ST from FSM, CLG transmits an acknowledge signal ACK. Note that, in order to initialize FSM and so on, a reset signal RES is provided, thereby making it possible to achieve a stable operation.

Figure 20A:
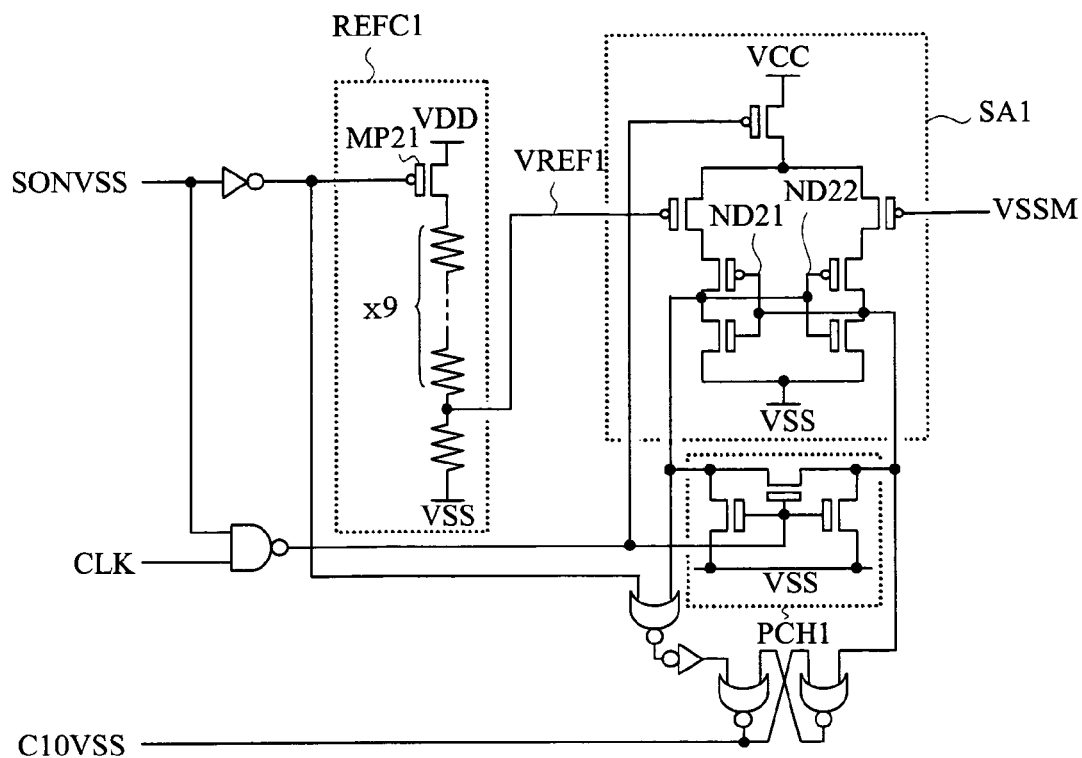
FIG. 20A is a view showing an example of a sensor circuit in the eleventh embodiment of the semiconductor integrated circuit device according to the present invention.
Figure 20B:
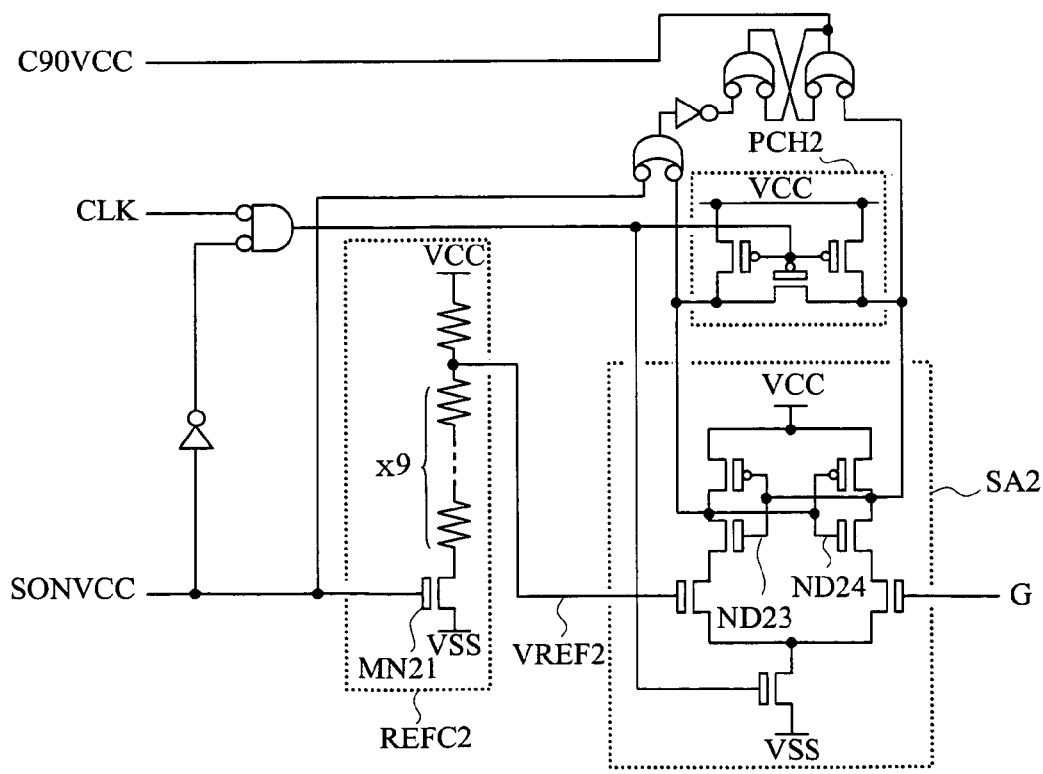
FIG. 20B is a view showing an example of a sensor circuit in the eleventh embodiment of the semiconductor integrated circuit device according to the present invention.

FIGS. 20A and 20B show an example of a sensor circuit for detecting a voltage level of the power switch controller described in FIG. 19. FIG. 20A shows a circuit for detecting a VSSM electric potential, and FIG. 20B shows a circuit for detecting a voltage level of a gate signal G of a power switch. These circuits are provided as circuits for detecting a voltage level in synchronism with a clock signal outputted from FSM, each of which is referred to as a dynamic comparator.

The sensor circuit shown in FIG. 20A will be described here. This circuit is provided as a circuit for monitoring a voltage level of VSSM, and detecting the monitored level to be obtained as 10% of VDD. This circuit is composed of a sense amplifier SA1, a pre-charge circuit PCH1, and a reference voltage generator circuit REFC1. When a control signal SONVSS is set at Hi, a clock is supplied to SA1 and PCH1 and VREF1 is outputted from a circuit of REFC1. In SA1, VREF1 and VSSM targeted for evaluation are entered, and a clock signal CLK is set at Lo, a P-type MISFET that is a power supply of a sense amplifier is turned OFF, and PCH1 carries out pre-charge. During a period in which the sense amplifier is set at Hi, the P-type MISFET that is a power supply of the sense amplifier is turned ON, and the sense amplifier is started up. The output nodes ND21 and ND22 change in accordance with values of VREF1 and VSSM. In the case where VSSM>VREF1, ND22 is set at Hi, and ND21 is set at Lo. On the other hand, in the case of VSSM<VREF1, ND22 is set at Lo, and ND21 is set at Hi.

VREF1 takes a method for outputting a value obtained as 10% of VDD by resistance division. This is the simplest system. This circuit consumes current while a value obtained as 10% of VDD is outputted as VREF1. However, when SONVSS is set at Lo, a power switch is turned OFF by means of a P-type MISFET (MP21) provided at the side of VDD of this resistance division. Therefore, in the case where this dynamic comparator does not operate, it is possible to reduce current consumption. In this example, while power supply of a VREF1 generator circuit due to resistance division is controlled by means of MP21, this control is mandatory in order to avoid malfunction because VSSM rises to the side of VDD at the time of power shutdown. Namely, in the case where MP21 is shut down, a voltage level of VREF1 becomes infinitely close to the side of VSS. This is because a resistance value used here is as much as 1 k$\Omega$ at most, and, in MP21, a voltage level is obtained as a value determined by resistance division when it's ON, and the resistance has a value of as much as 100$\Omega$ which is smaller by one digit. When the thus designed MP21 is switched OFF, its resistance value is increased by nine digits. Upon comparison with a resistance of 1 k$\Omega$, it is possible to consider an almost infinitely large resistance value. Thus, a value of VREF1 in the case where MP21 is turned OFF is very close to VSS. Therefore, in the case where an attempt is made to detect a level of VSSM, thereby operating this dynamic comparator, VREF1 shifts from VSS to 10% of VDD, and a VSSM level starts transition from the vicinity of VDD, thus making it possible to detect a desired value obtained as 10% of VDD without causing a malfunction.

The sensor circuit shown in FIG. 20B will be described next. This circuit is provided as a circuit for monitoring a voltage level of a gate signal G of a power switch, and detecting the monitored voltage level to be 90% of VCC. This circuit is composed of a sense amplifier circuit SA2, a pre-charge circuit PCH2, and a reference voltage generator circuit REFC2. When a control signal SONVCC is set at Hi, a clock is supplied to SA2 and PCH2 and VREF2 is outputted from a circuit of REFC2. In SA2, when this VREF2 and G targeted for evaluation are entered, and a clock signal CLK is set at Lo, a P-MISFET that is a power supply of a sense amplifier is turned OFF, then the PCH2 carries out pre-charge. On the other hand, during a period in which a clock signal is Hi, the P-type MISFET that is the power supply of the sense amplifier is turned ON, and the sense amplifier is started up. The output nodes ND23 and ND24 change in accordance with values of VREF2 and G. In the case of G<VREF2, ND24 is set at Hi, and ND23 is set at Lo. On the other hand, in the case where G>VREF2, ND24 is set at Lo, and ND23 is set at Hi.

VREF2 uses a method for outputting a value obtained as 90% of VCC by resistance division. This is the simplest system. This circuit consumes a current while a value obtained as 90% of VCC is outputted as VREF2. However, when SONVCC is set at Lo, a power switch is turned OFF by means of an N-type MISFET (MN21) provided at the side of VSS of this resistance division. Therefore, in the case where this dynamic comparator does not operate, it is possible to reduce current consumption. In this example, power supply of a VREF2 generator circuit due to resistance division is controlled by means of MN21. However, this control is mandatory in order to avoid a malfunction because G is fixed to the side of VSS at the time of power shutdown. Namely, a voltage level of VREF2 is infinitely close to the side of VCC in the case where MN21 is shut down. This is because the resistance value used here is as much as 1 k$\Omega$ at most, and, in MN21, a voltage level is obtained as a value determined by resistance division by setting its ON resistance as a value of as much as 100$\Omega$ which is smaller by one digit. When the thus designed MN21 is switched OFF, its resistance value is greater by nine digits. Upon comparison with a resistance of 1 k$\Omega$, it is possible to consider an almost indefinitely large resistance value. Thus, a value of VREF2 in the case where MN21 is turned OFF becomes very close to VCC. Therefore, in the case where an attempt is made to detect a level of G, thereby operating this dynamic comparator, VREF2 shifts from VCC to 90% of VCC, and the G level starts the transition from VSS, thus making it possible to detect a desired value obtained as 90% of VCC without causing a malfunction.

Figure 21A:
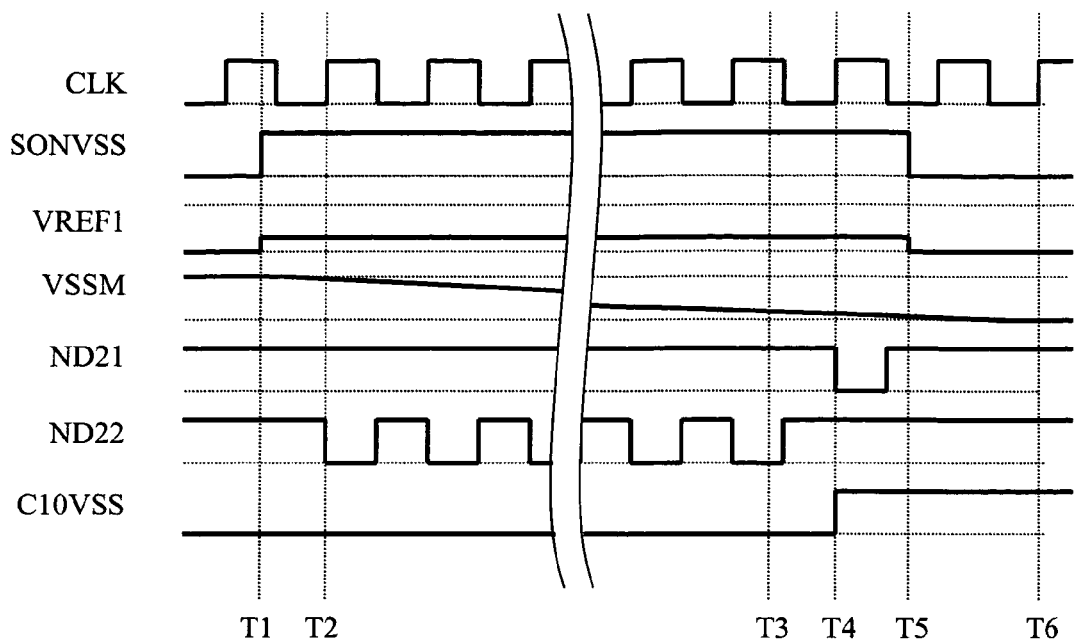
FIG. 21A is a view showing an example of an operating waveform of a dynamic comparator in the eleventh embodiment relating to the semiconductor integrated circuit device according to the present invention.
Figure 21B:
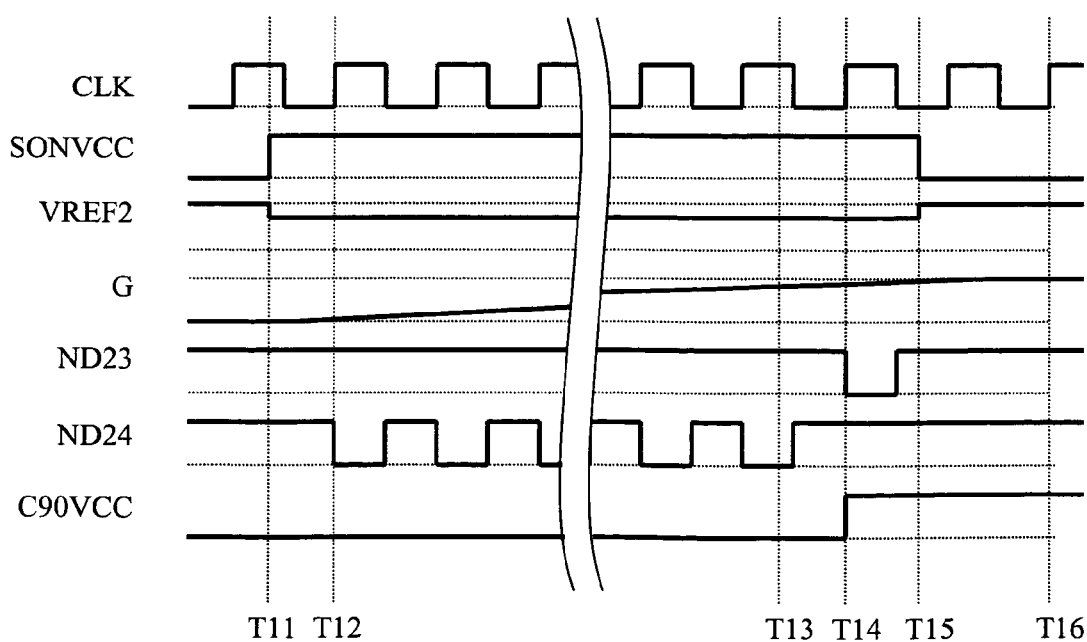
FIG. 21B is a view showing an example of an operating waveform of a dynamic comparator in the eleventh embodiment relating to the semiconductor integrated circuit device according to the present invention.

FIGS. 21A and 21B are views showing an example of an operating waveform of the dynamic comparator shown in FIG. 20. First, a description will be given with respect to FIG. 21A. First, when SONVSS is set at a Hi level at a time T1, a dynamic comparator starts operation. At this time, VREF1 outputs a 10% level of VDD, and a sense amplifier starts detecting a voltage level of VSSM. An operation of the sense amplifier is in synchronism with a clock. When a clock is set at a Hi level, values of ND21 and ND22 are compared with each other. During a period in which a clock is set at Lo, a pre-charge circuit operates, and the values of ND21 and ND22 are pre-charged by means of VCC. At a time T2, a clock is set at a Hi level. As a result, the sense amplifier is started up, ND21 is set at a Hi level, and ND22 is set at a Lo level. This state is established as a state in which a voltage level of VSSM is not equal to or smaller than 10% of VDD. During this period as well, an operation of turning ON the power switch is carried out, and thus, the VSSM level is continuously driven toward the side of VSS. There is shown a case in which, at a time T3, the VSSM level is set to be equal to or smaller than 10% of VDD across VREF1. At this time, in level evaluation by a next sense amplifier, ND21 is set at a Lo level, and ND22 is set at a Hi level. As a result, C10VSS is set at a Hi level, and because VSSM level detection has terminated, is transmitted to FSM. In this manner, SONVSS is controlled at a Lo level from FSM, and an operation of the dynamic comparator is terminated.

Next, a description will be given with respect to FIG. 21B. First, when SONVCC is set at a Hi level at a time T1, a dynamic comparator starts operation. At this time, VREF2 outputs a level of 90% of VCC, and a sense amplifier starts detecting a voltage level of G. An operation of the sense amplifier is in synchronism with a clock. When a clock is set at a Hi level, values of ND23 and ND24 are compared with each other. During a period in which a clock is set at Lo, a pre-charge circuit operates, and the values of ND23 and ND24 are pre-charged by means of VCC. At a time T2, a clock is set at a Hi level. Thus, the sense amplifier is started up, ND23 is set at a Hi level, and ND24 is set at a Lo level. This state is established as a state in which a VSSM level is not equal to or greater than 90% of VCC yet. During this period as well, an operation of turning ON a power switch is carried out. Thus, a voltage level of G is continuously driven toward the side of VCC. There is shown a case in which a voltage level of G is equal to or greater than 90% of VCC across VREF2 at a time T3. At this time, in level evaluation by a next sense amplifier, ND23 is set at a Lo level, and ND24 is set at a Hi level. As a result, C90VCC is set at a Hi level, and because VSSM level detection has terminated, is transmitted to FSM. In this manner, SONVCC is controlled at a Lo level from FSM, and an operation of the dynamic comparator terminates.

Figure 22:
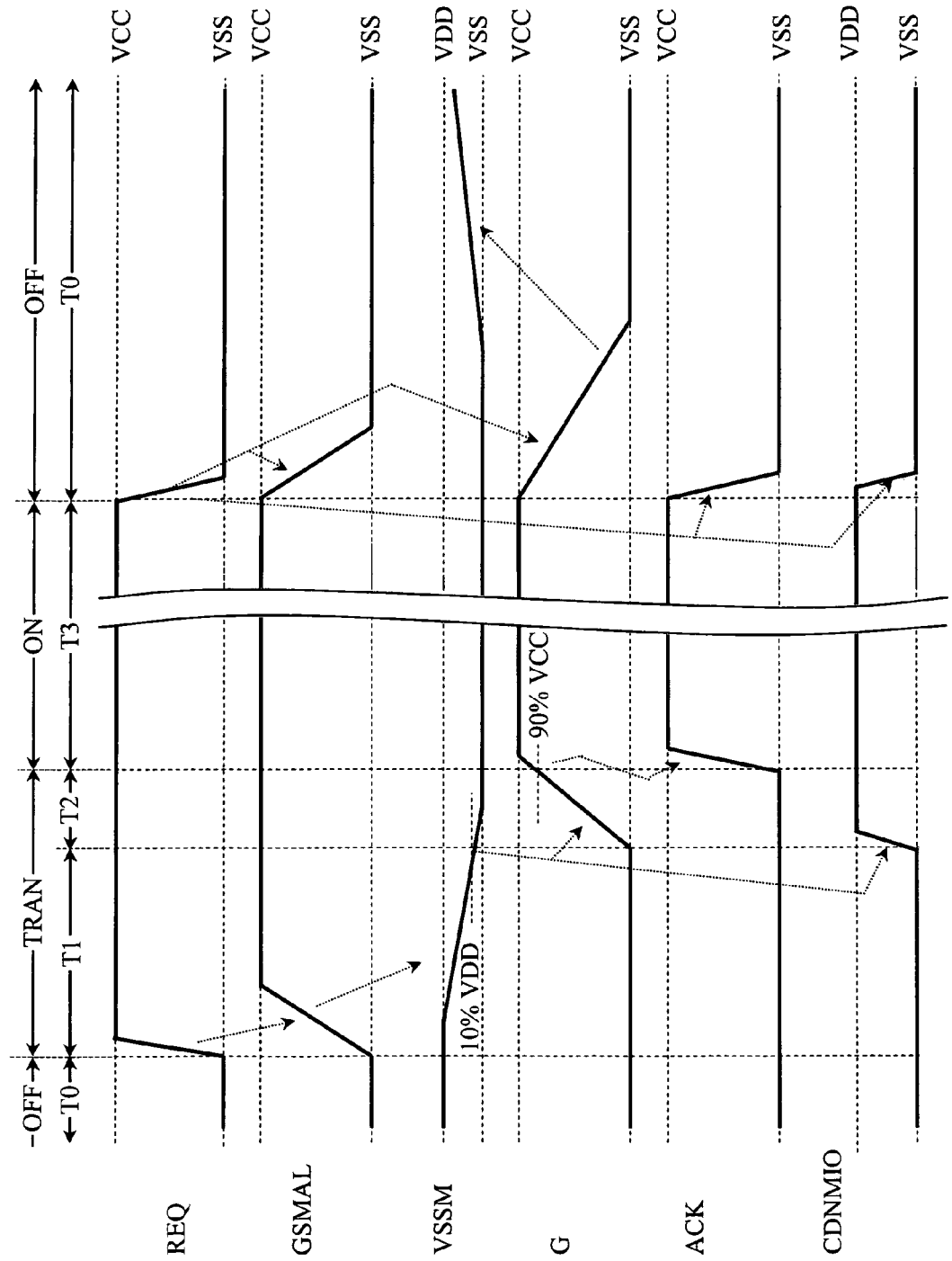
FIG. 22 is a view showing an example of an operating waveform of a power switch controller in the eleventh embodiment relating to the semiconductor integrated circuit device according to the present invention.

FIG. 22 shows an example of an operating waveform of a power switch controller described in FIG. 19. FIG. 22 shows a period (T0 state) in which a power switch is turned OFF; a transition period (T1 state or T2 state) for turning ON a power switch; and a period (T3 state) in which a power switch is tuned ON.

First, a request signal REQ is set at Hi, whereby a power switch OFF state T0 moves to a transition period T1 state. At this time, a gate signal GSMAL of a small size power switch is driven so as to move from Lo to Hi, and then, to set an electric potential of VSSM at a ground level 0V. A SENSLOVSS circuit detects a VSSM level to be 10% VDD, for example; transmits a C10VSS signal to FSM in the case where the VSSM level is lower than 10% VDD; and stops operation of the sensor circuit. Having received the C10VSS signal, FSM moves a current state to a T2 state immediately, and transits the result to CLG, thereby driving a gate signal G of a large size driver.

This voltage level of G is sensed by means of SENS90VCC. The SENS90VCC detects a level of G to be 90% VCC, for example, stops a SENS90VCC circuit, and transmits C90VCC to FSM. Having received C90VCC, FSM moves a current state to a T3 state, and transmits the result to CLG. The CLG receives the result, and transmits an ACK signal.

This power switch controller carries out control of the micro (μ) I/O described in the patent document 2 mentioned above. The micro I/O is a circuit for restricting a penetration current generated in an input side circuit under the influence in the case where a signal value is obtained as an indefinite value at the time of power shutdown in signal exchanged between a plurality of power shutdown areas. This micro I/O is provided as an AND circuit having a signal amplitude level converting function as required.

A control signal of this micro I/O circuit is made to be equal to or smaller than a logical threshold value of a circuit when a VSSM level is equal to or smaller than 10% VDD. Thus, a large penetration current does not flow, and thus, a control for CDNMIO to be changed from Lo to Hi is carried out at a time at which VSSM is set at 10% VDD. In this manner, in the case where ACK has been transmitted, the micro I/O can already operate, thus, making it possible to exchange a signal immediately.

Next, turning OFF a power switch will be described. First, REQ is changed from Hi to Lo, whereby the power switch controller starts shutdown control of a power switch. In this case, the power switch is turned OFF by changing a control of a driving a current signal to Lo based on gate signals of a small size driver and a large size driver. An ACK signal and CDNMIO assume control at a time point at which REQ has been entered. Control is carried out such that Lo is set, and, having received REQ, a power switch is turned OFF immediately, thereby disabling use.

Twelfth Embodiment

Figure 23:
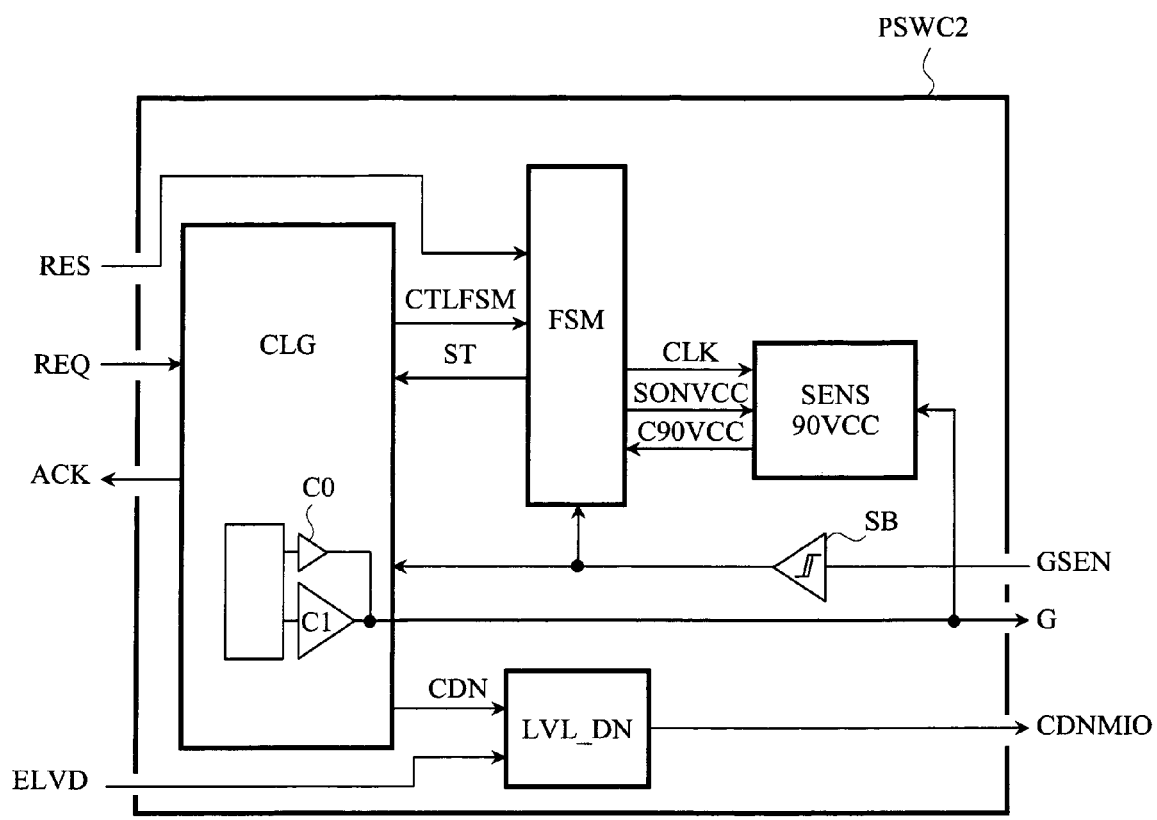
FIG. 23 is a view showing another example of a power switch controller in a twelfth embodiment relating to the semiconductor integrated circuit device according to the present invention.
Figure 24:
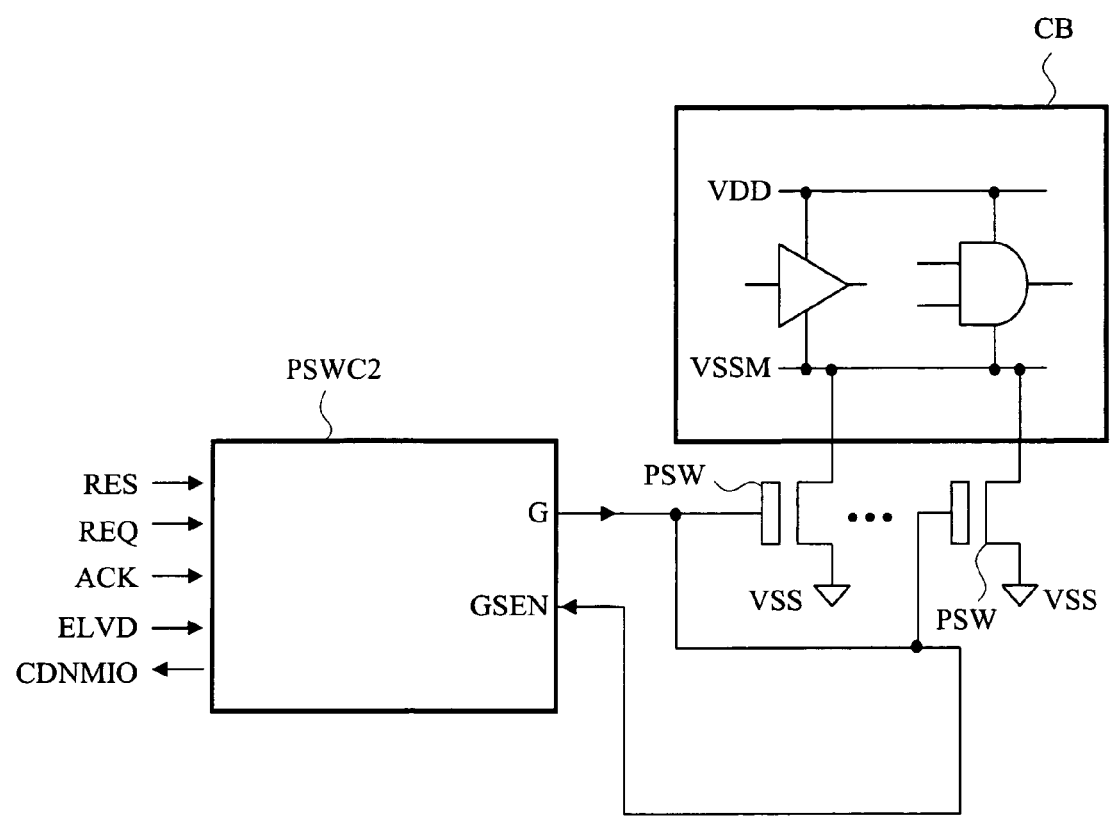
FIG. 24 is a view showing an example of a connection relationship between a power switch controller and a power switch in the twelfth embodiment relating to the semiconductor integrated circuit device according to the present invention.
Figure 25:
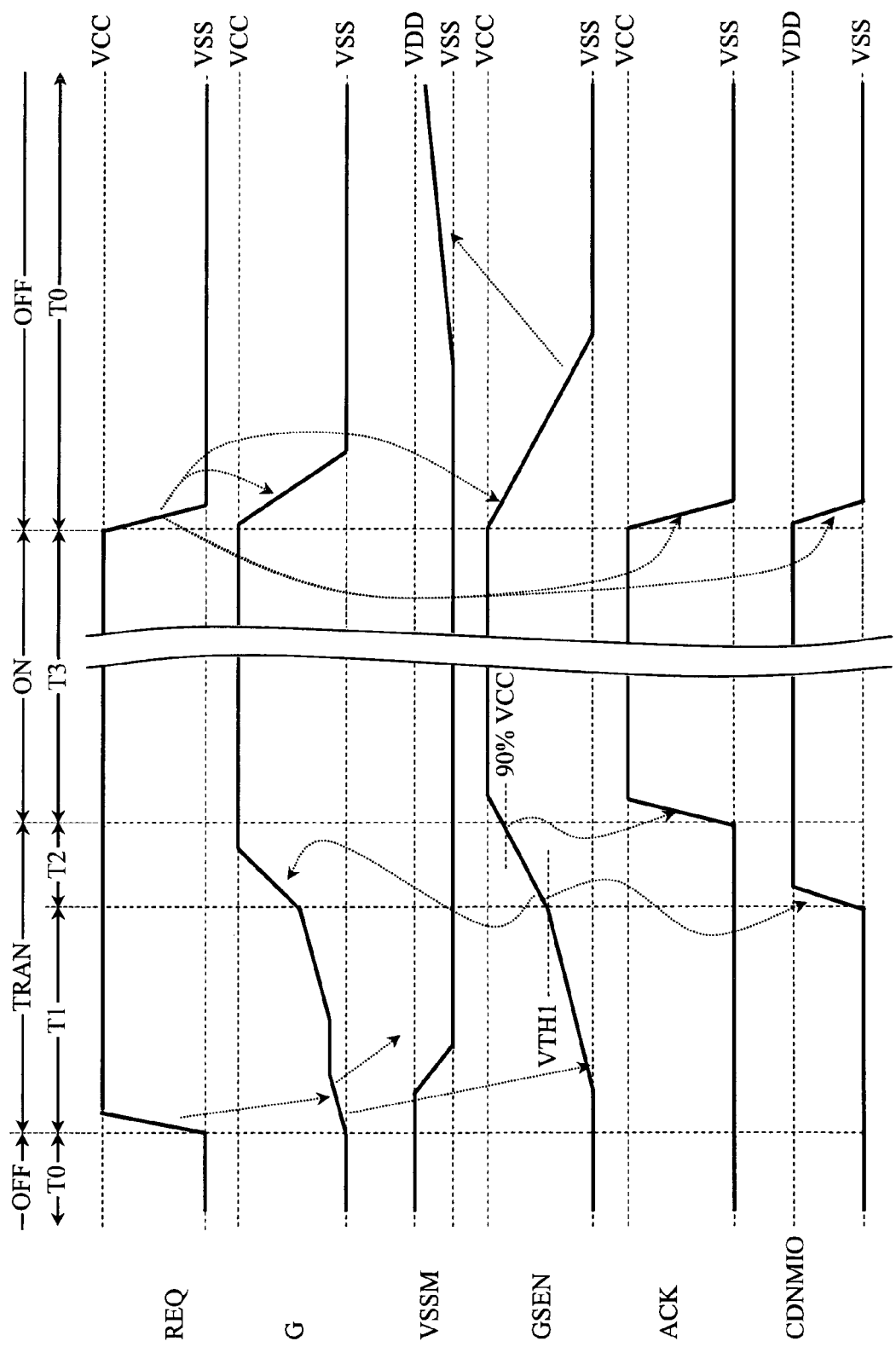
FIG. 25 is a view showing an example of an operating waveform of a power switch controller in the twelfth embodiment relating to the semiconductor integrated circuit device according to the present invention.

With reference to FIGS. 23-25, a description will be given with respect to a twelfth embodiment of a semiconductor integrated circuit device according to the present invention.

FIG. 23 is a view showing another example of a power switch controller. Like the power switch controller shown in FIG. 19, this power switch controller is also composed of a MISFET having a large gate insulating film thickness used in I/O. This switch controller is operated by means of a VCC (for example, 3.3V) and VSS serving as operating power supplies. This power switch controller PSWC2, unlike the example shown in FIG. 19, is characterized in that a power switch is of one type of large size switch, and a driver for controlling the power switch is of two types, a small size and large size. There is no need for limiting the number of drivers to two. Although not shown, a control of a plurality of types of the power switches may be achieved by selectively using them.

A power switch controller PSWC2 shown in FIG. 23 is composed of: a control logic circuit CLG; a finite state machine FSM; a sensor circuit SENS90VCC of a gate signal level of a power switch; a level converter circuit LVL DN for generating a micro I/O control signal; and a small size power switch. SESN90VCC is driven by means of a control signal SONVCC, and a detection completion signal C90VCC is transmitted at a time point at which a level of a gate signal G of the power switch is set at 90% VCC. FSM carries out control of a power switch based on information sent from a sensor circuit. While CLG carries out control of a micro I/O, the micro I/O is composed of a MISFET having a small gate insulating film that is operated by means of a VDD power supply and a VSS power supply. Thus, a signal CDN having a VCC amplitude is converted and outputted to a micro I/O control signal CDNMIO having a VDD amplitude through a level converter circuit.

A synchronizing type comparator synchronized with a clock signal is used for a sensor circuit of a voltage level. Thus, this voltage sensor senses a voltage level while dynamically repeating supply of a clock from FSM to the voltage sensor and comparison with pre-charge by means of the clock signal. This clock may be oscillated inside of FSM by using a ring oscillator or the like.

This power switch controller PSWC2 operates an internal control circuit and drives a power switch when the controller has received a request signal REQ. A method for controlling the power switch uses a two-stage switch size switching type of switching and driving a small size power switch and a large size power switch. By doing this, a mass current called an inrush current for electrically charging a VSSM level can be reduced. This system drives a gate signal of a large size power switch by means of a small size driver, thus making it possible also to slowly set a gate of a power switch at a Hi level, and slowly turn ON a power switch.

At this time, a capacitance called a mirror capacitance can be generated between a gate and a drain of the power switch. A gate signal of the power switch is temporarily obtained as a constant value in order to charge this mirror capacitance. This is a phenomenon that occurs when a voltage between a source and a drain of a small size driver has an almost constant value, and thus, this driver serves as one kind of constant charge supply circuit. A period in which this mirror capacitance is charged, is also a period in which an N-type MISFET channel is gradually formed in a power switch, and coincides with a period in which VSSM is charged. At this time, a voltage of a gate electrode is substantially equal to a threshold value of an N-type MISFET that is a power switch. Therefore, a current supply capability of the power switch in this period is very weak, thus making it possible to reduce a current for charging VSSM.

Next, a description of an operation will be given. When a request signal REQ is inputted, a control logic circuit CLG transmits a startup signal to a finite state machine FSM. At this time, a small driver CO starts driving a gate G of a power switch. As described in FIG. 22B in detail, this FSM carries out state transition by monitoring a voltage level of a node GSEN at which a node at the most distal end side of a gate signal G of the power switch is drawn into the power switch controller. At this driver C0, a plurality of drivers having a variety of driving forces are produced in advance, thus making it possible to select a desired driving force. For example, utilizing the fact that, when transistors having the same gate widths are vertically stacked, a current is halved, and when transistors having the same gate widths are connected in parallel, a current is doubled, using some types of a plurality of vertically stacked drivers at stages and a plurality of drivers connected in parallel, makes it possible to achieve the invention.

A Schmidt trigger buffer SB for detecting a voltage trigger of this GSEN with rough precision and a sensor circuit SENS90VCC for measuring the detected voltage level with high precision are provided. Based on the sense signals from the buffer and sensor, a state of a power switch is transmitted to CLG by means of a signal ST. First, upon the receipt of an output of the Schmidt trigger buffer SB, FSM notifies CLG that a large driver drive state is established, and, upon the receipt of that signal, CLG starts driving a large driver G1. Further, when FSM receives that a power switch has been turned ON based on a sense signal from SENS90VCC, FSM transmits to CLG that a state in which the power has been turned ON is established. Upon the receipt of that signal, CLG transmits an acknowledge signal ACK. In order to initialize FSM etc., a more stable operation can be achieved by providing a reset signal RES.

FIG. 24 is a view showing an example of a connection relationship of the power switch controller and the power switch described in FIG. 23. A control signal G of the power switch connects a gate of a power switch PSW for supplying power supply to a circuit of an independent power shutdown area (CB) and connects gates of a plurality of N-type MISFETs. At this time, a node at the most distal end side is returned to a power switch controller PSWC2, and this is defined as GSEN. Although G and GSEN are logically the same nets, a G wiring capacitance and a wiring resistance are large, and thus, becomes a very high load. Therefore, the values of response to this wiring is significantly different from each other at the distal end side and at the proximal end side depending on an RC time constant that is a product of a resistor R and a capacitor C. Thus, when a voltage is monitored at the proximal end side, there is a danger that an acknowledge signal is generated before a voltage does not rise sufficiently at the distal end side. This danger can cause a malfunction. Therefore, the danger of such a malfunction is avoided by monitoring the distal end side.

FIG. 25 shows an example of an operating waveform of a power switch controller described in FIG. 23. FIG. 23 shows a period (T0 state) in which a power switch is turned OFF; a transition period (T1 state or T2 state) for turning ON a power switch; and a period (T3 state) in which a power switch is turned ON. First, a request signal REQ is set at Hi, whereby a power switch moves from OFF state T0 to a transition period T1 state. At this time, a small size driver C0 is turned ON, and thus, a gate signal GSEN of a power switch slowly starts moving from Lo to Hi. In the midway, an increase in gate electrodes appears to be temporarily stopped in order to charge a mirror capacitance between a gate and a drain of a power switch. However, charging of VSSM completes in this duration, and subsequently, there is no danger that an inrush current is generated.

In switching between a small size driver and a large size driver, a Schmidt trigger driver receives GSET that is a node at the most distal end side of a gate signal G of a power switch, and switches the node when a logical threshold value of that Schmidt trigger driver has been exceeded. At this time, a state of the power switch moves to a T2 state, and a large side driver C1 is driven. SENS90VCC senses this voltage level of GSEN. SENS90VCC detects that a level of G is obtained as 90% VCC, for example, stops a SENS90VCC circuit, and transmits C90VCC to FSM. Having received C90VCC, the FSM moves a current state to a T3 state immediately, and transmits the result to CLG. The CLG transmits an ACK signal upon the receipt of the result.

This power switch controller also has a control signal of a micro I/O. The control signal of this micro I/O circuit carries out a control for changing CDNMIO from Lo to Hi when a gate signal of the power switch has exceeded a Schmidt logic threshold value VTH1. At this time, VSSM is completely 0V, and thus, a penetration current at the micro I/O does not flow. In this manner, in the case where ACK has been transmitted, the micro I/O can be already operable, thus making it possible to exchange a signal immediately.

Next, turning OFF the power switch will be described. First, REQ is charged from Hi to Lo, whereby a power switch controller starts shutdown control of the power switch. In this case, the power switch is turned OFF by making a control for driving both gate signals of a small size driver and a large size driver to Lo. An ACK signal and CDNMIO are control that, at a time point at which REQ has been entered, wherein control is carried out such that Lo is set, and having received REQ, a power switch is turned OFF immediately, thereby disabling its use.

A method for controlling a power switch controller has been described above. It is indispensable to actually mount a power switch on an LSI and to evaluate the characteristics in order to improve product quality. When a power switch is integrated on an LSI, the most noticeable point is to grasp a voltage drop phenomenon of a peripheral circuit caused by an inrush current when turning ON the power switch, and a voltage drop phenomenon caused by an ON resistance of a power switch, which depends on a size of the power switch. Therefore, when an on-chip high precision voltage circuit is present, it becomes possible to select the size of the power switch and to obtain a proper size of a driver for driving the power switch, based on the finding obtained by a test chip.

Thirteenth Embodiment

With reference to FIG. 26, a description will be given with respect to a thirteenth embodiment relating to a semiconductor integrated circuit device according to the present invention.

Figure 26A:
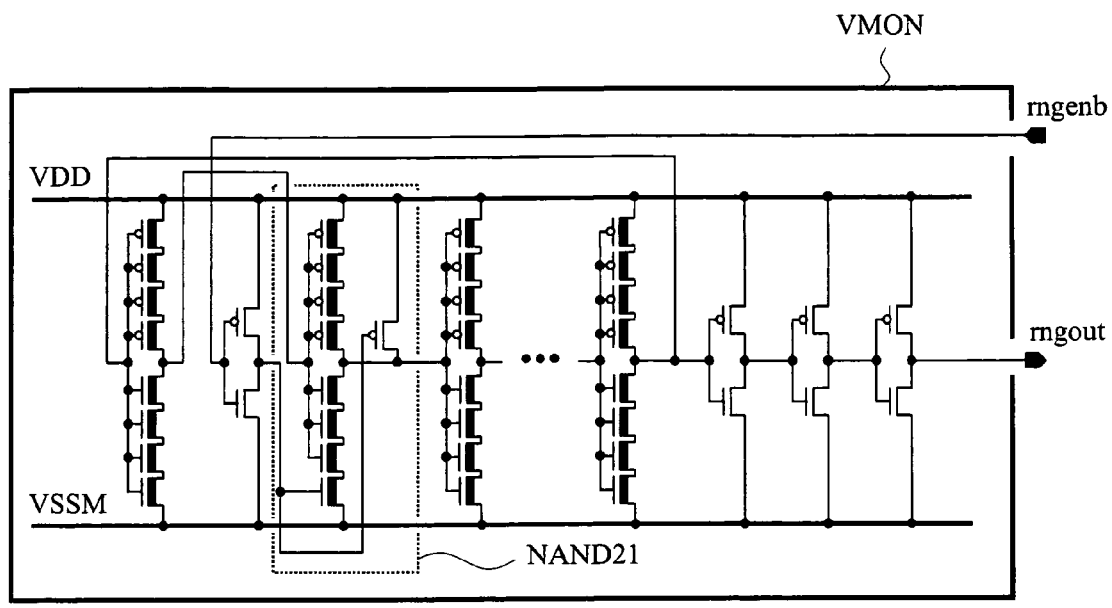
FIG. 26A is a view showing an example of a voltage monitor circuit in a thirteenth embodiment relating to a semiconductor integrated circuit device according to the present invention.
Figure 26B:
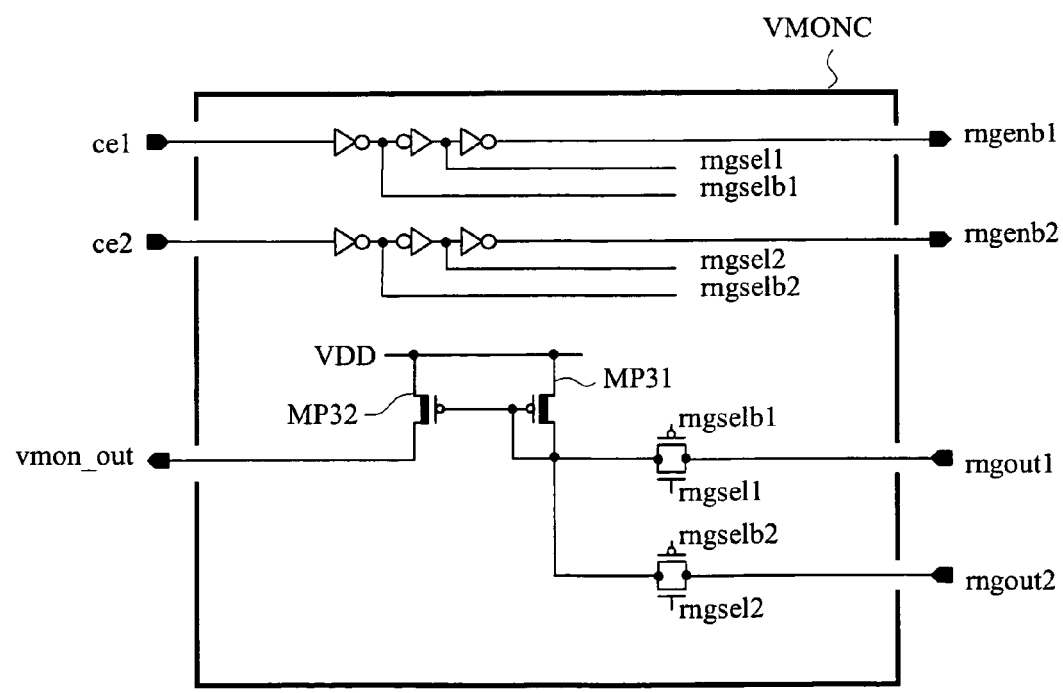
FIG. 26B is a view showing an example of a voltage monitor circuit in a thirteenth embodiment relating to a semiconductor integrated circuit device according to the present invention.

FIGS. 26A and 26B are views showing an example of a voltage monitor circuit for evaluating a fluctuation of a power voltage. This voltage monitor circuit is composed of: a voltage monitor shown in FIG. 26A; and a monitor voltage amplifier circuit for amplifying an output signal of a voltage monitor shown in FIG. 26B.

First, a voltage monitor VMON shown in FIG. 26A will be described. This circuit is designed by using two types of MISFETs having different threshold values. Here, a circuit in which a channel section of a transistor is blackened is a MISFET having a small threshold value. This circuit is basically composed of a ring oscillator circuit, and operates to deactivate or stop function in the case where no voltage is monitored. This deactivating function is carried out by means of a NAND function. Namely, when a startup signal inversion signal "rngenb" of the ring oscillator is set at Lo, the internal ring oscillator starts operation. When "rngenb" is set at Hi, the internal ring oscillator stops operation. This is achieved by a non-conjunction circuit NAND21.

A reason why a low threshold value type MISFET is used for the ring oscillator is that a MISFET has a good response property to convert a fluctuation of a very small power voltage to an oscillation frequency of the ring oscillator with high precision. In addition, a MISFETs having small threshold values are vertically stacked so that the oscillation frequency of the ring oscillator is reduced.

An oscillation output signal "rngout" of a voltage monitor must pass through a wiring having several millimeters between a point at which a voltage monitor is mounted and a monitor voltage amplifier VMONC, and that load becomes very large. Thus, there is a danger that a signal disappears partway in the wiring if a frequency is so high. An output of the ring oscillator is amplified by means of a buffer, and the amplified output is transmitted as "rngout" to the monitor voltage amplifier.

Next, a description will be given with respect to a monitor voltage amplifier circuit VMONC shown in FIG. 26B. This figure shows an example of controlling two voltage monitors VMON. This circuit comprised mainly a current mirror type amplifier circuit composed of a P-type MISFET, and selects whether or not an output from a voltage monitor is made conductive by means of a transmission gate. In the case where the output from the voltage monitor is conductive, the output is received by a drain of a P-type MISFET having a low threshold value, and a voltage monitor output signal "vmon_out" is outputted with an amplification rate that is determined depending on a gate width ratio between MP21 and MP22.

Although the embodiment has shown an example in which two VMONs have been connected to VMONC, a required number of select circuits and transmission gates are added, and the added transmission gates are connected to a drain of MP21, thereby making it possible to selectively remove and evaluate signals from a plurality of voltage monitors.

Fourteenth Embodiment

Figure 27:
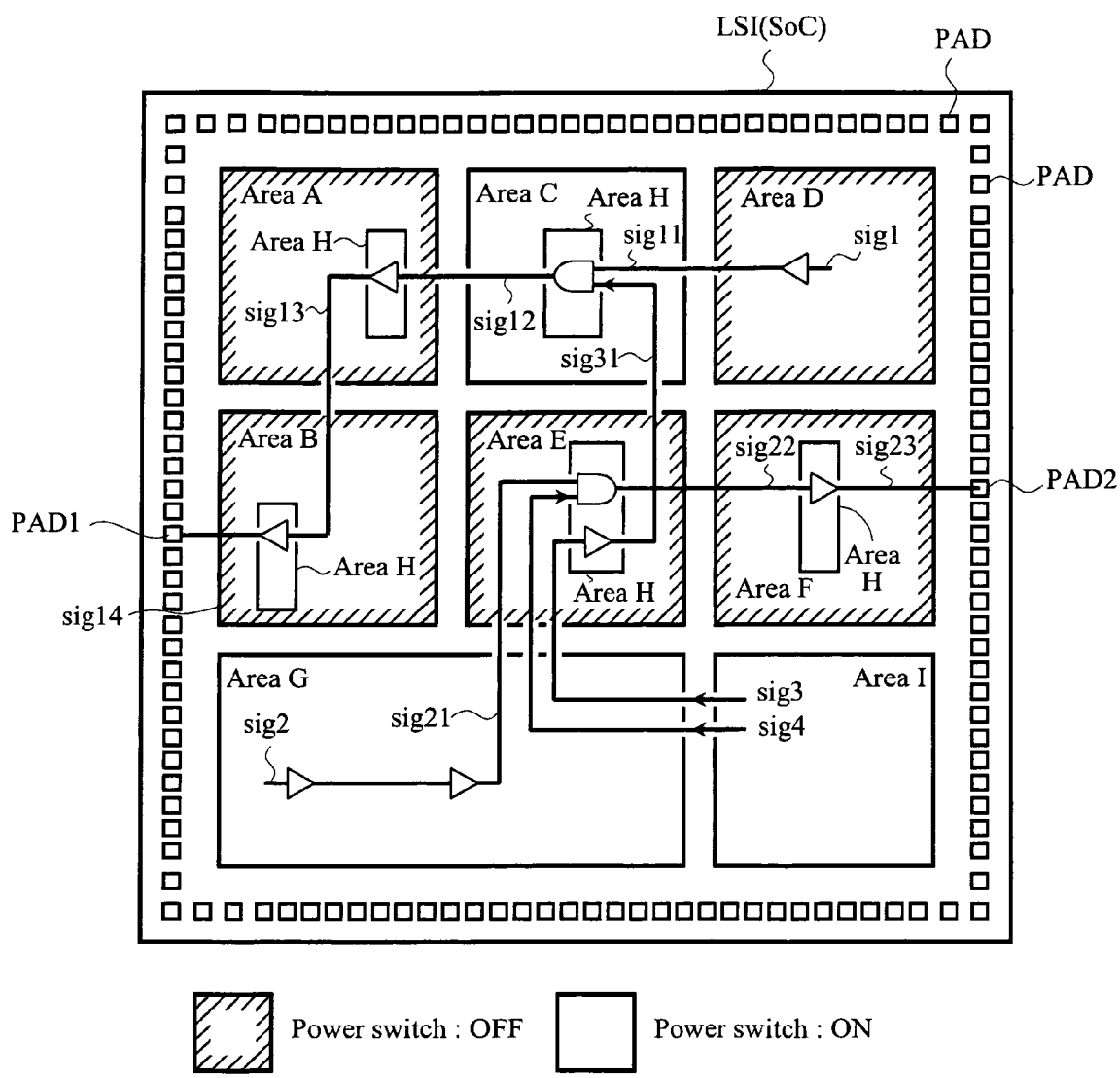
FIG. 27 is a view showing an example in the case where a configuration of a power supply separating area is mounted on a chip in a fourteenth embodiment relating to a semiconductor integrated circuit device according to the present invention.

With reference to FIG. 27, a description will be given with respect to a fourteenth embodiment relating to a semiconductor integrated circuit device according to the present invention.

FIG. 27 shows an example where constituent elements of a power supply separating area shown in FIG. 1 are mounted on a chip. The present embodiment shows an example of a repeater circuit. FIG. 27 assumes Area C, Area G, Area I, and Area H as regions in which a power switch is turned ON. In consideration of a power domain hierarchy shown in FIG. 1, these areas correspond to PDH1 to PDH3. Here, Area H is provided as one of the subsidiary power domains that are allocated to be dispersed in power domains. The areas in which the power switch is shut down are Area A, Area B, Area D, Area E, and Area F. In consideration of the power domain hierarchy shown in FIG. 1, this case corresponds to a case in which power is shut down in PDH4.

First, let us consider a signal wiring sig1 to be transmitted to a pad PAD1 from area D. In this case, sig1 must be passed through any of the upper layers of Area A, Area B, Area C, Area E, and Area F. Here, it is assumed that Area C, Area A, and Area B are passed. In this case, Area C and Area D have a relationship that power supplies are independently shut down, and there is no power shutdown priority relationship between these two power domains. Therefore, signal wiring sigh from Area D cannot be inputted to a circuit in Area C as it is. In a concept of hierarchy described in FIG. 1, the above-described problem is avoided via Area H that falls into a "parent" in the upper hierarchy of Area C and Area D. Thus, in FIG. 27, this sigh is received in Area H incorporated in Area C. The circuit receiving sigh in this Area H is a circuit receiving a signal which first enters from a power shutdown area to a power applying area. Thus, this circuit must be an indefinite signal propagation prevention circuit (μI/O). Here, there is shown an example of achieving a function with an AND function. In this example, propagation of an indefinite signal is blocked in the case where sig31 is set at Lo after control has been carried out by means of a signal of the signal wiring sig31.

Now, a description will be given with respect to a signal of sig31. The signal of sig31 is a signal obtained when a signal of a μI/O control signal wiring sig3 generated in Area I has been relayed by means of a repeater circuit mounted in Area H contained in Area E. There is a possibility that power is shut down when this control signal passes through Area E from Area I, thus making it necessary to relay the control signal through a relay buffer circuit contained in a subsidiary power domain Area H. This Area H is defined as a subsidiary power domain, and is mounted in Area C, Area A, and Area B. Thus, signals of sig12, sig13, and sig14 may be relayed in a circuit contained in Area H.

Now, an example of sending out a signal from Area G to a pad PAD2 is shown. In this example, a repeater is provided in the same power supply shut down area, and then, a signal is relayed in another power domain. In this case, it is assumed that Area E and Area F are passed. When signal wiring sig21 is relayed, a relationship between Area G and Area E falls into one that Area G is a "parent" of Area E. If relaying is carried out in Area E as it is in the case where power is shut down in Area E, signal transmission is disabled.

Therefore, this problem is avoided by mounting a relay circuit in a subsidiary power domain, i.e., Area H in which a relay buffer has been installed in Area E. This circuit in Area H must be provided as a µI/O circuit. This is because, even if power is shut down in Area G, power may be continuously applied to Area H. This control of µI/O is carried out by control signal wiring sig4 from Area I. Then, an output signal from this µI/O is relayed in Area H contained in Area F, and the relayed output signal is transmitted to PAD2.

In this way, a plurality of power domains is divided inside of an LSI (SoC). When these power domains have a power shutdown relationship with each other as shown in FIG. 1, there is attained an advantageous effect that a design of a repeater circuit is facilitated by using a subsidiary power domain.

Fifteenth Embodiment

Figure 28:
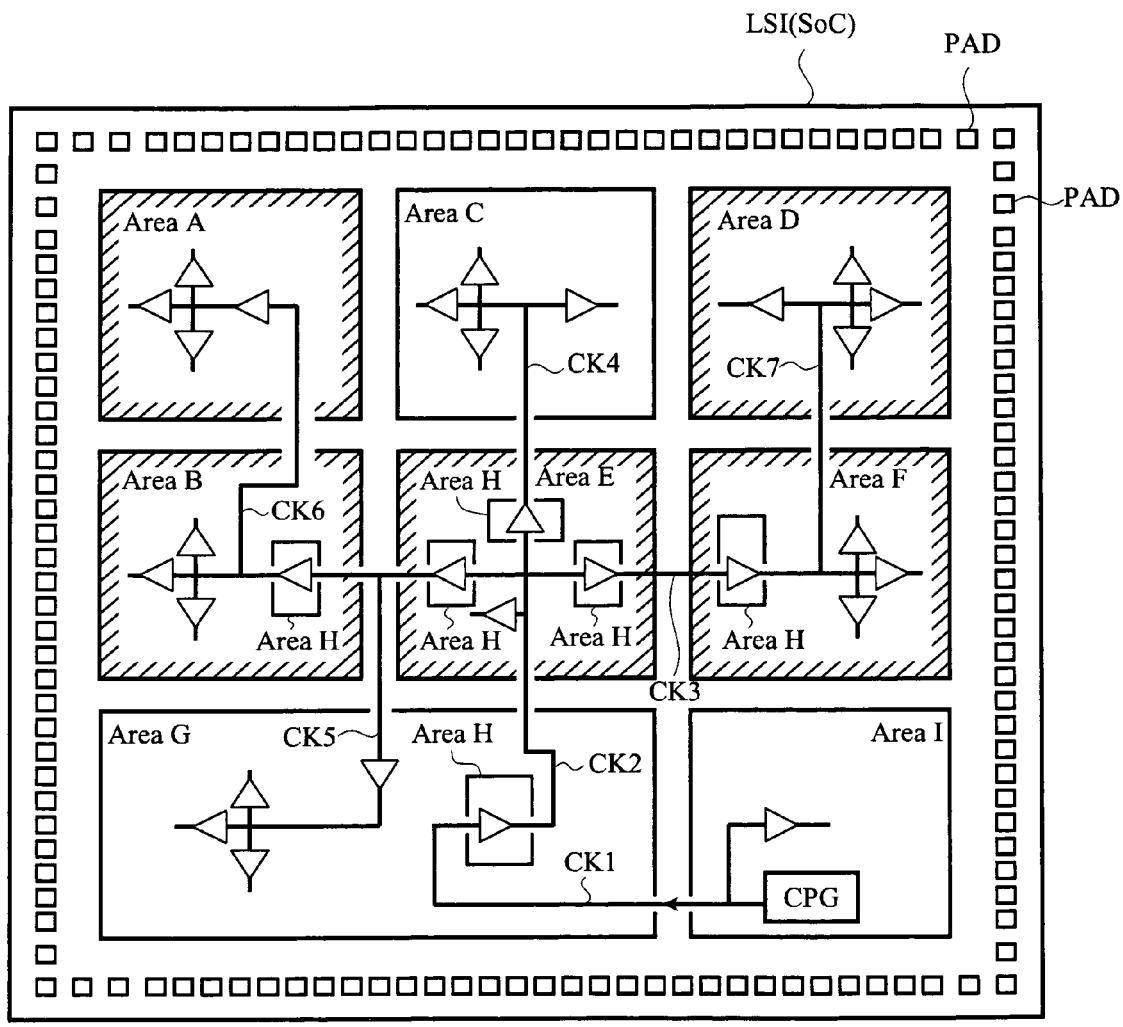
FIG. 28 is a view showing an example where a configuration of a power supply separating area is mounted on a chip in a fifteenth embodiment relating to a semiconductor integrated circuit device according to the present invention.
Figure 28:
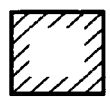
Figure 28:

With reference to FIG. 28, a description will be given with respect to a fifteenth embodiment relating to a semiconductor integrated circuit device according to the present invention.

FIG. 28 shows an example where constituent elements in the power supply separating area shown in FIG. 1 are mounted on a chip. The present embodiment shows an example of mounting a clock buffer circuit of FIG. 28 assuming that Area C, Area G, Area I, and Area H are areas in which a power switch is turned ON. In consideration of the power domain hierarchy shown in FIG. 1, these areas correspond to PDH1 to PDH3. Here, Area H is provided as one of the subsidiary power domains allocated to be dispersed in power domains. Areas in which a power switch is shut down are Area A, Area B, Area D, Area E, and Area F. In consideration of the power domain hierarchy shown in FIG. 1, this case corresponds to a case in which power is shut down in PDH4.

It is general that a clock signal is first outputted from a clock pulse generator CPG, and then, the outputted clock signal is distributed to a whole chip via relay buffers located at a plurality of stages. This CPG must be installed in an area in which a frequency of carrying out the power shutdown is low. The present embodiment assumes that this CPG is mounted in the highest hierarchy, i.e., Area I, in the hierarchy of power domains shown in FIG. 1. A clock signal from CPG contained in Area I is temporarily wired to the center of a chip because there is a need for adjusting a skew in equal length wiring or the like. In this case, FIG. 28 shows an example of wiring a signal to Area E through Area G. In this Area G, power is shut down independently of a group of Area A, Area B, and Area C, thus making it impossible to relay a clock signal in this Area G.

Therefore, when Area H is used as a subsidiary power domain, the relaying of a clock signal is carried out using a clock buffer installed therein. A clock system signal wiring CK2 distributed to Area E is used for clock distribution into Area E, and clock distribution into other power domains must be carried out. In FIG. 28, a clock buffer in Area E is used for a clock distributed into Area E, and a clock is distributed into any other areas by using a clock buffer contained in Area H of subsidiary power domain. Clock system signal wirings CK3, CK4, and CK5 are distributed in this manner.

CK3 is a signal to be distributed from the inside of Area E to the inside of Area F. This signal further assumes clock distribution into Area D. Therefore, this signal is provided as a clock of a clock system signal wiring CK7 via a clock buffer contained in a subsidiary power domain Area H, installed in Area F. CK7 may be passed through a clock buffer in Area F as a circuit for receiving a signal distributed into Area F. With respect to the clock distributed into Area D as well, clocks may be further distributed by using a clock buffer installed in Area D in the case where the clocks in Area D and subsequent are not distributed into any other power domain.

CK4 is a signal distributed from the inside of Area E to the inside of Area C. Clocks may be further distributed by using a clock buffer installed in Area C in the case where the clocks in Area C and subsequent are not distributed into any other power domain.

CK5 is a signal distributed from the inside of Area E to the insides of Area B and Area G. A clock signal distributed into Area G is relayed via a clock buffer contained in Area G, and the relayed signal is distributed into Area G. On the other hand, a clock signal distributed into Area B is provided as a clock of a clock system signal wiring CK6 via a clock buffer contained in a subsidiary power domain, i.e., Area H, installed in Area B, because clock distribution from Area B into Area A is further considered. CK6 may be passed through a clock buffer in Area B as a circuit for receiving a signal distributed into Area B. Clocks distributed into Area A may be further distributed by using a clock buffer installed in Area A in the case where the clocks in Area A and subsequent are not distributed into any other power domain.

In this manner, a plurality of power domains are divided inside of an LSI (SoC). In the case where these areas have a power shutdown relationship with each other as shown in FIG. 1, there is attained an advantageous effect that a design of a clock distributing circuit is facilitated by using a subsidiary power domain.

The invention made by the Inventor has been specifically described above with reference to the embodiments. The present invention is not limited to the foregoing embodiments. Of course, various modifications can occur without departing from the spirit of the invention.

The present invention is directed to a semiconductor integrated circuit. In particular, the present invention is effectively applied to a system LSI oriented to a cellular phone device or a microprocessor.

Additional advantages and modifications will readily occur to those skilled in the art. Therefore, the invention is not limited to the specific details and representative embodiments shown and described herein. Accordingly, various modifications may be made without departing from the spirit or scope of the general inventive concept as defined by the appended claims and their equivalents.

What is claimed is:

1. A semiconductor integrated circuit device formed on one chip comprising:
   a first functional block connected to a first power supply and a second power supply;
   a second functional block connected to the first power supply and a third power supply and communicating with the first functional block;

a third functional block connected to the first power supply and a fourth power supply and communicating with the first functional block;

a fourth functional block connected to the first power supply and a fifth power supply and communicating with the second functional block;

a fifth functional block connected to the first power supply and a sixth power supply and communicating with the second functional block;

a first power switch shutting down the first functional block;

a second power switch shutting down the second functional block;

a third power switch shutting down the third functional block;

a fourth power switch shutting down the fourth functional block; and a fifth power switch shutting down the fifth functional block, wherein the second to sixth power supplies are independently supplied from each other, wherein the first functional block is shut down by the first switch only when the second to fifth functional blocks are shut down, wherein the second functional block is shut down by the second switch only when the fourth and fifth functional blocks are shut down, wherein a signal transmission between the second functional block and the third functional block is performed via the first functional block, wherein a signal transmission between the fourth functional block and the fifth functional block is performed via the first functional block or the second functional block, wherein a signal transmission between the fourth functional block and the third functional block is performed via the first functional block, wherein each of the signal transmission paths from the second functional block to the first functional block, from the third functional block to the first functional block, from the fourth functional block to each of the first and second functional blocks, and from the fifth functional block to each of the first and second functional blocks has an indefinite signal propagation prevention circuit, and wherein the signal transmissions paths from the first functional block to each of the second to fifth functional blocks, and from the second functional block to each of the fourth and fifth functional blocks have no indefinite signal propagation circuits.

2. A semiconductor integrated circuit device according to claim 1, wherein the first functional block is dispersively laid out inside of each of the second to fifth functional blocks, wherein the first functional block has a plurality of circuit cells that are arranged in a direction perpendicular to power supply wirings in a lowest layer of power supply layers of basic circuit cells, and wherein a power supply for the first functional block is wired in a meshed shape so that a drop of a power voltage is minimized in the power supplies of the second to fifth functional blocks.

3. A semiconductor integrated circuit device according to claim 2, wherein the power supply for the first functional block is provided in common.

4. A semiconductor integrated circuit device according to claim 1, wherein the first functional block has a signal relay buffer for wirings of a long distance signal.

5. A semiconductor integrated circuit device according to claim 1, wherein the first functional block has a first clock buffer circuit for a distribution of a clock signal.

6. A semiconductor integrated circuit device according to claim 5, wherein the first clock buffer outputs a clock signal to a second clock buffer which is provided in another functional block.

7. A semiconductor integrated circuit device according to claim 1, wherein the first functional block has a latch circuit for backing up information when the power of another functional block is shut down.

* * * * *